(12) United States Patent
Kishimoto

(10) Patent No.: US 11,148,510 B2
(45) Date of Patent: Oct. 19, 2021

(54) SHADING DEVICE

(71) Applicant: Sakai Display Products Corporation, Osaka (JP)

(72) Inventor: Katsuhiko Kishimoto, Osaka (JP)

(73) Assignee: Sakai Display Products Corporation, Osaka (JP)

( * ) Notice: Subject to any disclaimer, the term of this patent is extended or adjusted under 35 U.S.C. 154(b) by 0 days.

(21) Appl. No.: 16/983,424

(22) Filed: Aug. 3, 2020

(65) Prior Publication Data

US 2020/0361293 A1 Nov. 19, 2020

Related U.S. Application Data

(63) Continuation of application No. 15/757,280, filed as application No. PCT/JP2017/015387 on Apr. 14, 2017, now Pat. No. 10,766,342.

(51) Int. Cl.
*B60J 3/04* (2006.01)
*B60J 3/02* (2006.01)
(Continued)

(52) U.S. Cl.
CPC . *B60J 3/04* (2013.01); *B60J 3/02* (2013.01); *B60J 3/0278* (2013.01); *B60R 1/00* (2013.01);
(Continued)

(58) Field of Classification Search
CPC ... B60J 3/04; B60J 3/02; B60J 3/0278; G60R 1/00; B60R 1/005; B60R 1/10; B60R 11/04; G02F 1/13
See application file for complete search history.

(56) References Cited

U.S. PATENT DOCUMENTS 10,449,902 B1 10/2019 Englander et al.
2006/0062570 A1 3/2006 Kikuchi et al.
(Continued)

FOREIGN PATENT DOCUMENTS

JP H0520908 U 3/1993
JP H07234395 A 9/1995
(Continued)

OTHER PUBLICATIONS

English Translation of the International Preliminary Report on Patentability, PCT Application No. PCT/JP2017/015387, dated Oct. 24, 2019.
(Continued)

*Primary Examiner* — Kent W Chang
*Assistant Examiner* — Sujit Shah
(74) *Attorney, Agent, or Firm* — Snell & Wilmer L.L.P.

(57) ABSTRACT

A shading device comprises: a shading member formed using a dimming glass plate capable of changing light transmittance, the shading member having a plate shape; a display apparatus being capable of transmitting light and disposed on a surface of the shading member, the surface being to face an operator during use of the shading member, in such a manner that a display portion faces the operator; an image pickup device to pick up, as an image, a region which an opposite surface of the surface faces, and generate image pickup data; a data processing circuit to generate display image data to be displayed on the display portion during use of the shading member, based on the image pickup data generated by the image pickup device; and a switch to change light transmittance of the dimming glass plate.

8 Claims, 16 Drawing Sheets

(51) Int. Cl.
*B60R 1/00* (2006.01)
*B60R 1/10* (2006.01)
*B60R 11/04* (2006.01)
*G02F 1/13* (2006.01)
*B60R 11/00* (2006.01)

(52) U.S. Cl.
CPC ............. *B60R 1/005* (2013.01); *B60R 1/10* (2013.01); *B60R 11/04* (2013.01); *G02F 1/13* (2013.01); *B60R 2011/0035* (2013.01); *B60R 2300/202* (2013.01)

(56) References Cited

U.S. PATENT DOCUMENTS

| | | |
|---|---|---|
| 2006/0140502 A1 | 6/2006 | Tseng et al. |
| 2007/0075627 A1* | 4/2007 | Kimura ............... H01L 27/3216 313/503 |
| 2007/0222252 A1* | 9/2007 | Suzuki ................... B60J 3/0204 296/97.8 |
| 2008/0158124 A1* | 7/2008 | Kim ..................... G09G 3/3648 345/92 |
| 2009/0011278 A1* | 1/2009 | Choi ................... H01L 51/5234 428/690 |
| 2009/0115326 A1 | 5/2009 | Chan et al. |
| 2009/0160630 A1 | 6/2009 | Bauer et al. |
| 2011/0074746 A1 | 3/2011 | Chang et al. |
| 2012/0268000 A1* | 10/2012 | Choi ................... H01L 51/5234 313/504 |
| 2013/0082163 A1 | 4/2013 | Chen et al. |
| 2013/0286177 A1 | 10/2013 | Deleeuw et al. |
| 2014/0332781 A1 | 11/2014 | Tokuda et al. |
| 2015/0348455 A1* | 12/2015 | Jeon ................. G02F 1/134336 345/55 |
| 2015/0355521 A1* | 12/2015 | Alton .................. G02B 27/0172 250/214 AL |
| 2015/0360618 A1 | 12/2015 | Richard |
| 2015/0367714 A1 | 12/2015 | Kim |
| 2016/0042567 A1 | 2/2016 | Shuster et al. |
| 2016/0114731 A1 | 4/2016 | Habibi |
| 2016/0253971 A1* | 9/2016 | Shepard ............. G06K 9/00228 345/667 |
| 2016/0350049 A1 | 12/2016 | Barnidge et al. |
| 2017/0013188 A1* | 1/2017 | Kothari .................. B60K 35/00 |
| 2017/0090266 A1 | 3/2017 | Wang |
| 2018/0233550 A1* | 8/2018 | Han ..................... H01L 27/3211 |

FOREIGN PATENT DOCUMENTS

| | | |
|---|---|---|
| JP | H10329541 A | 12/1998 |
| JP | 2005122981 A | 5/2005 |
| JP | 2006091249 A | 4/2006 |
| JP | 2007242498 A | 9/2007 |
| JP | 2008068692 A | 3/2008 |
| JP | 2009078597 A | 4/2009 |
| JP | 2009227018 A | 10/2009 |
| JP | 2010217581 A | 9/2010 |
| JP | 2014222592 A | 11/2014 |
| JP | 2017034615 A | 2/2017 |
| JP | 2017065388 A | 4/2017 |
| WO | 2017022172 A1 | 2/2017 |

OTHER PUBLICATIONS

English Translation of International Search Report, PCT Application No. PCT/JP2017/015387, Japan Patent Office, dated May 23, 2017.

* cited by examiner

SHADING DEVICE

CROSS-REFERENCE TO RELATED APPLICATIONS

This patent application is a continuation of U.S. application Ser. No. 15/757,280, having a filing/§ 371(c) date of Apr. 24, 2019, which is a U.S. National Stage of PCT/JP2017/015387, filed Apr. 14, 2017. The entire disclosure of each patent application set forth in this Cross-Reference to Related Applications section is incorporated by reference.

TECHNICAL FIELD

The present invention relates to a shading device.

BACKGROUND ART

When being in a room, for example, inside a building or inside a vehicle and sunlight directly illuminates a field of vision of a person, the glare of light can make it difficult to look squarely out the window or the occurrence of glare can make it difficult to ensure normal visibility. In such a case, a shading device is sometimes used to obstruct sunlight with a plate-shaped member having a certain size. By disposing a shading device close to inside a window of, for example, a vehicle, the sunlight illuminating the vehicle compartment is obstructed, and the glare is reduced. For a shading device for automobile, for example, attempts have been made to combine a shading device, which is positioned in front of driver's eyes when in use, with another device. For example, Patent Document 1 discloses, a shading device provided with a liquid crystal display apparatus as a display portion of a television set or a navigation system.

PRIOR ART DOCUMENT

Patent Document
Patent Document 1: JPH 7-234395

SUMMARY OF THE INVENTION

Problems to be Solved by the Invention

As described above, using the shading device, the glare by sunlight can be reduced. On the other hand, using the shading device, a portion of the field of vision from inside of a vehicle compartment or the like is obstructed. Thus, blind spots can be created in the view outside the window, which should be visible from, for example, inside of the vehicle. In particular, when the shading device for a vehicular driver seat is positioned in a use position, the blind spot often occurs in an upper region in front of a vehicular driver. Therefore, traffic lights or a road sign positioned above the vehicular driver's line of vision does not necessarily come into sight of the vehicular driver, and the vehicular driver can overlook the traffic lights or a road sign by visual interference caused by objects positioned in the vehicular driver's line of vision. Further, the conventional shading device is o formed in a size such that only an area close to an upper periphery of a window is obstructed by the shading device so as to secure a vehicular driver's central vision. However, such a shading device cannot sufficiently obstruct sunlight in the time period when the altitude of the sun is low, for example, in the morning or afternoon. Further, the conventional shading device, in particular when it is used for is used for an automobile, needs to be positioned where it does not cover the front windshield when the sunlight does not illuminate a vehicle compartment and moved to a use position when direct sunlight needs to be obstructed. This process is complicated for the vehicular driver.

Accordingly, an object of the present invention is to provide a shading device in which a region obstructed by the shading member during use of the shading device can be displayed to be oriented to an operator of a shading member and, moreover, it is difficult to produce blind spots even when the shading device is positioned in a use position when not in use.

Means to Solve the Problem

A shading device of an embodiment of the present invention is characterized by comprising: a shading member formed using a dimming glass plate capable of changing light transmittance, the shading member having a plate shape; a display apparatus being capable of transmitting light and disposed on a surface of the shading member, the surface being to face an operator during use of the shading member, in such a manner that a display portion faces the operator; an image pickup device to pick up, as an image, a region which an opposite surface of the surface faces, and generate image pickup data; a data processing circuit to generate display image data to be displayed on the display portion during use of the shading member, based on the image pickup data generated by the image pickup device; and a switch to change light transmittance of the dimming glass plate.

Effect of the Invention

According to the present invention, a shading device can be provided with which an image of view including a region obstructed by the shading member during an use of the shading device can be displayed to be facing an operator of the shading member, so that it is difficult to produce blind spots even when the shading device is positioned in a use position when not in use.

EMBODIMENT FOR CARRYING OUT THE INVENTION

Next, an embodiment of a shading device of the present invention will be described with reference to the drawings. Materials for, shapes of, and their relative positions or the like, constituent elements in the embodiment described below are merely illustrative. The shading device of the present invention is not is construed to be limitative thereto. A shading device of the first embodiment will also be described next by way of example of a shading device for a bus that is attached in the vicinity of a front windshield. However, the shading device of the present invention is construed to be not limited to motor vehicles such as buses, trucks or general motor vehicles, and can be used in a variety of vehicles such as trains, ships and airplanes and a variety of buildings such as houses and office buildings.

First Embodiment

Figure 1:
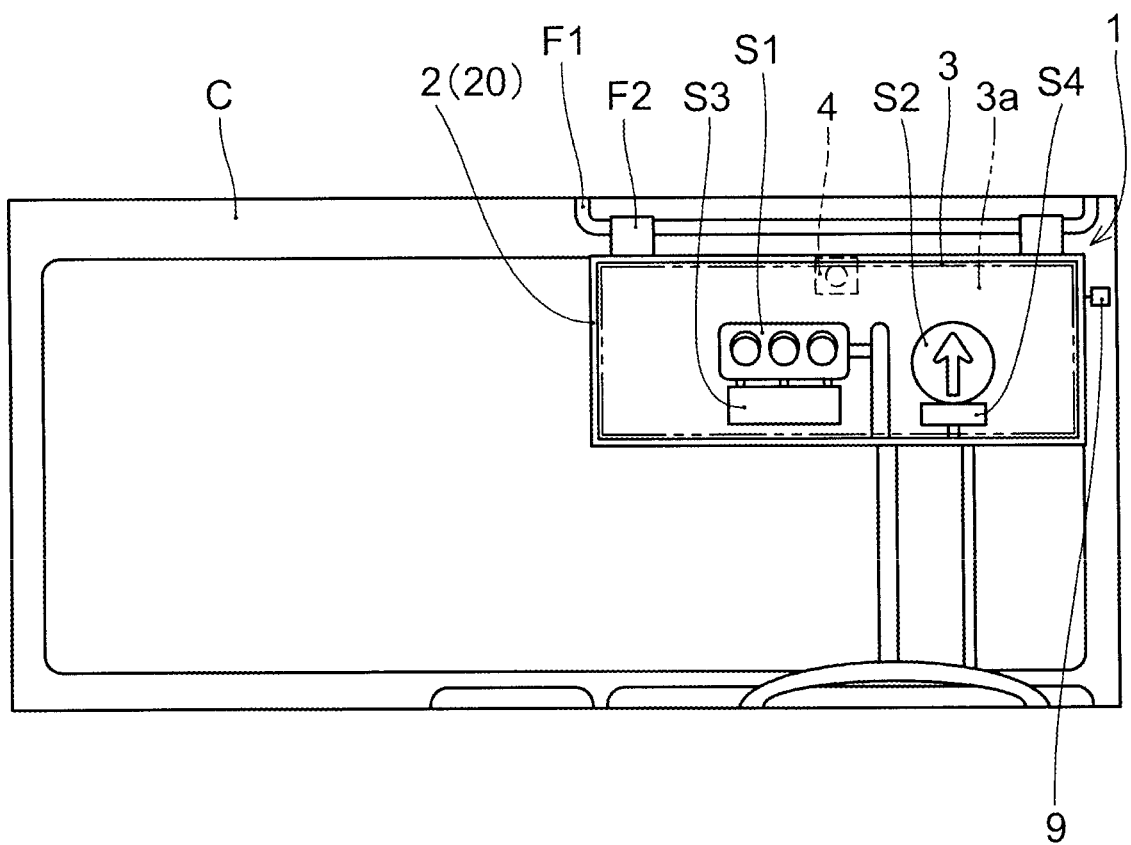
FIG. 1 shows a shading device according to a first embodiment of the present invention in a use position.
Figure 2:
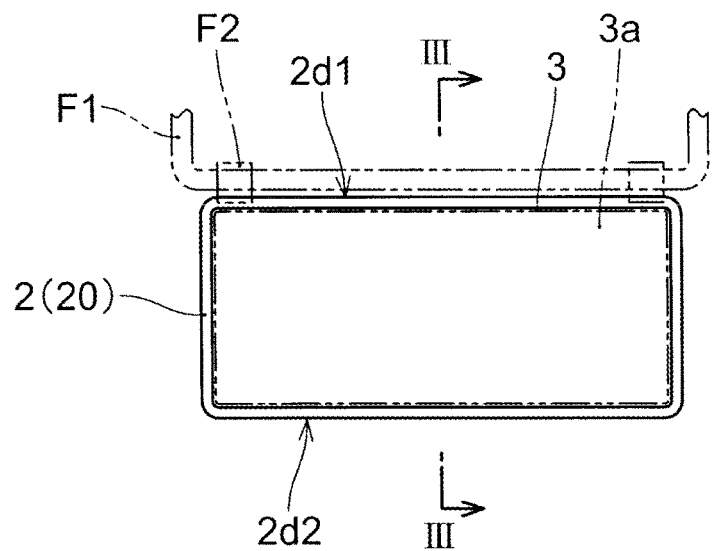
FIG. 2 shows a front view of a shading member of the shading device and a display apparatus according to the first embodiment.

In FIG. 1, a shading device 1 of the first embodiment is shown in a state in which the shading device is disposed in a vehicle compartment of a motor vehicle (bus) C and is positioned in a use position. In FIG. 2, a shading member 2 and a display apparatus 3 of the shading device 1 are shown, and, in FIG. 3, a cross-sectional view along a line III-III of FIG. 2 is shown. In addition, in FIG. 4, an image pickup region 41 to be picked up as an image by an image pickup device 4 of the shading device 1 is schematically shown.

As shown in FIG. 1 to FIG. 4, the shading device 1 of the embodiment is provided with: a plate-shaped shading device 2; and a display apparatus 3 disposed on a surface 2a of the shading member 2. The surface 2a is to face an operator of the shading member 2, in other words, a vehicular driver M in the embodiment, during use of the shading member 2. The display apparatus 3 is disposed in such a manner that a display portion 3a faces the vehicular driver M. The shading member 2 is formed using a dimming glass plate 20 capable of changing light transmittance. The display apparatus 3 is formed using a light transmissive material capable of transmitting light. The shading device 1 is further provided with an image pickup device 4 that picks up, as an image, a region which an opposite surface 2b of the surface 2a of the shading member 2 faces, and generates image pickup data. In the following description, the "surface 2a of the shading member 2 is referred to as a "first surface 2a" of the shading member 2 as well. The opposite surface 2b of the surface 2a is referred to as a "second surface 2b" of the shading member 2 as well. The shading device 1 is further provided with: a data processing circuit 5 (see FIG. 12) that generates display image data to be displayed on a display portion 3a of the display apparatus 3 during use of the shading member 2, based on the image pickup data generated by the image pickup device 4; and a switch 9 that changes light transmittance in a dimming glass plate 20 that constitutes the shading member 2. The switch 9 is conceptually shown as a functional block in a rectangular shape in FIG. 1. Although not shown, the image pickup device 4 and the data processing circuit 5 are connected to each other so as to enable data transmission and reception in a wired or wireless manner.

In the following description, the "use" of the shading member 2 means that at least a portion of the sunlight that can illuminate a region which the first face 2a faces is obstructed by the shading member 2 by positioning the shading member 2 in a position in which a second face 2b is illuminated by sunlight. In addition, "use state" of the shading member 2 is a state in which the "use" of the shading member 2 is made, and "use position" of the shading member 2 is a position in which the shading member 2 is in the "use state".

The shading member 2, in an example shown in FIG. 1, is attached to the ceiling portion or the like of the vehicular compartment of a motor vehicle C using a supporting member F1 having a flat U-shape and an engaging member F2 that is rotatably combined with the supporting member F1. The dimming glass plate 20 that constitutes the shading member 2 can change light transmittance and, according to the variation, can transmit light or obstruct light. The dimming glass plate 20 includes: two glass plates 21a, 21b that are provided to oppose each other; and a liquid crystal sheet 22 that is disposed between glass plates 21a and 21b. As described later, the dimming glass plate 20 changes light transmittance based on a magnitude of a voltage that is applied to the liquid crystal sheet 22. The voltage that is applied to the liquid crystal sheet 22 is switched by the switch 9.

The switch 9 is an electrical switch that is connected between vehicular power supply unit (such as a battery, an alternator or a voltage regulator that generates a stabilized voltage upon receipt of battery power or the like) and the dimming glass plate 20. In this case, the switch 9 switches between two states, that is, a state in which a given voltage is applied and a state in which the given voltage is not applied to the dimming glass plate 20. The switch 9 can also change a reference voltage to be a reference value of an output voltage of the voltage regulator (not shown) to thereby switch a voltage to be applied to the dimming glass plate 20 that is connected to an output of the voltage regulator. For example, the switch 9 can be a variable resistor or the like, which is connected between the power supply unit and a grounding line and connected to a reference voltage input terminal of the voltage regulator at an intermediate terminal. In this case, the switch 9 can change light transmittance in the dimming glass plate 20 stepwisely or continuously. In the switch 9, an arbitrary switching element capable of switching whether a voltage is applied to the dimming glass plate 20 or capable of changing a magnitude of the applied voltage to the dimming glass plate 20 is used. The switch 9 can be operated manually by the vehicular driver M, or, as described later, can be operated by any other constituent element of the shading device 1.

As described previously, the display apparatus 3 is formed using a light transmissive material. Therefore, when the dimming glass plate 20 is set in a light transmissive state by the switch 9, a person in the vehicular compartment, such as a vehicular driver M, for example, can see a view outside the vehicle through the display apparatus 3 and the shading member 2.

Figure 3:
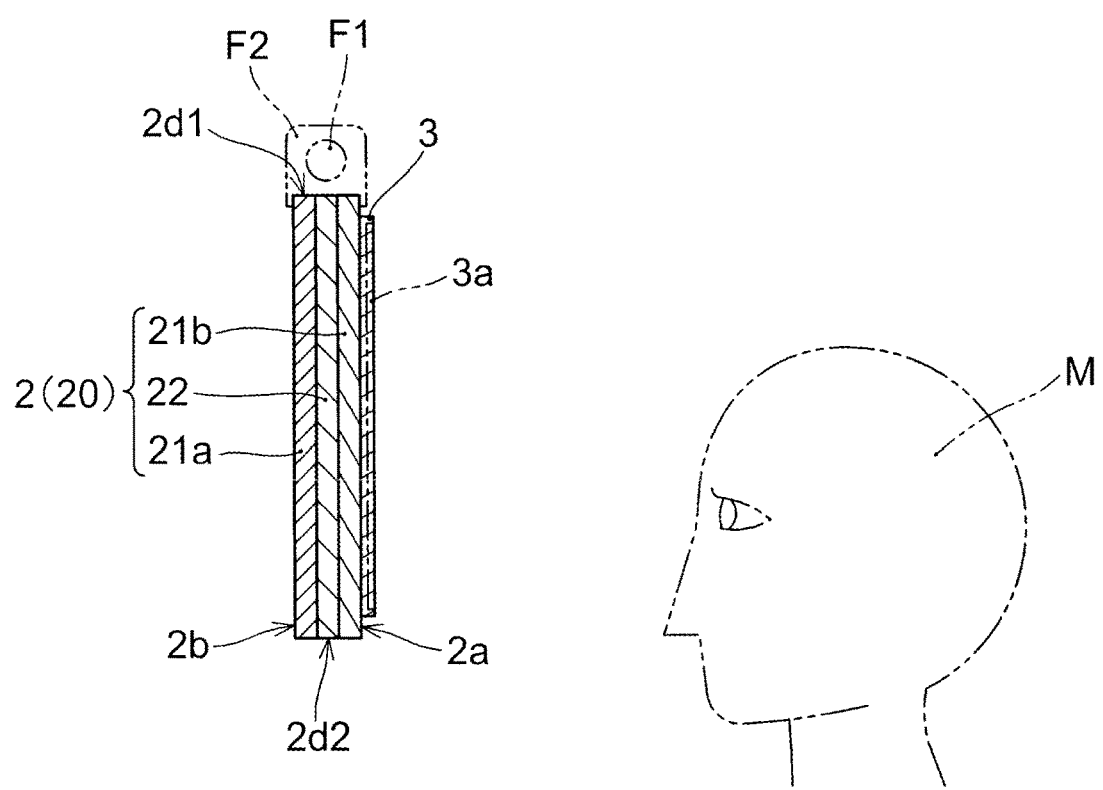
FIG. 3 shows is a cross-sectional view along a line III-III of FIG. 2.

On the other hand, when sunlight illuminates the vehicular compartment, the sunlight is obstructed using the switch 9 to thereby reduce the light transmittance of the dimming glass plate 20. Also, based on the image pickup data that is generated by the image pickup device 4, an image of the view outside the vehicle which the second face 2b of the shading member 2 faces can be displayed on the display portion 3a of the display apparatus 3. The display portion 3a of the display apparatus 3 is a portion (for example, a display screen) on which an image is actually displayed. In the embodiment, almost the entirety of the surface of the display apparatus 3a that faces the vehicular compartment is the display portion 3a. In FIGS. 1 to 3, for the sake of clarity, the display portion 3a is shown by the chain double-dashed line along a circumferential edge of the display apparatus 3 or a surface facing the vehicular compartment (in the drawings other than FIGS. 1 to 3, the display portion 3a is not shown).

FIG. 1 shows a state in which an image is displayed on the display apparatus 3, and, on the display apparatus 3 shown in FIG. 1, an image of traffic lights S1 and a road sign S2 indicative of "only this way to cruise", a guidance sign S3 indicative of essential landmarks or the like, and an auxiliary sign S4 indicative of the traffic restriction time of the road sign S2 or the like are displayed. The traffic lights S1 and the road sign S2 that are displayed on the display apparatus 3 in FIG. 1 are essentially present in positions to be included in a field of vision of a vehicular driver in the situation shown in FIG. 1. However, if the light transmittance of the dimming glass plate 20 is lowered to obstruct sunlight, a region in which the traffic lights S1 or the like is present is obstructed by the shading member 2, and the traffic lights S1 or the like cannot be directly visually recognized by the vehicular driver M. In the embodiment, however, the view outside the vehicle is picked up, as an image, by the image pickup device 4, and the view to be essentially seen at the position of the dimming glass plate 20 is displayed as an image on the display portion 3a of the display apparatus 3 that faces the inside of the vehicle compartment. According to the shading device 1 of the embodiment, the vehicular driver M or the like can check traffic lights or a road sign or the like against sunlight without visually missing it. In Japan, as road signs, the abovementioned road sign and guidance sign and main signs including instructive signs indicative of specific permissions or instructions and alerting signs indicative of warnings or cautions; and auxiliary signs are set. According to the shading device 1 of the embodiment, the view obstructed by the dimming glass plate 20 of which light transmittance is lowered is displayed on the display apparatus 3 and, thus, even against sunlight, the vehicular driver M can clearly check even letters or the like written on the guidance signs or auxiliary signs.

Figure 4:
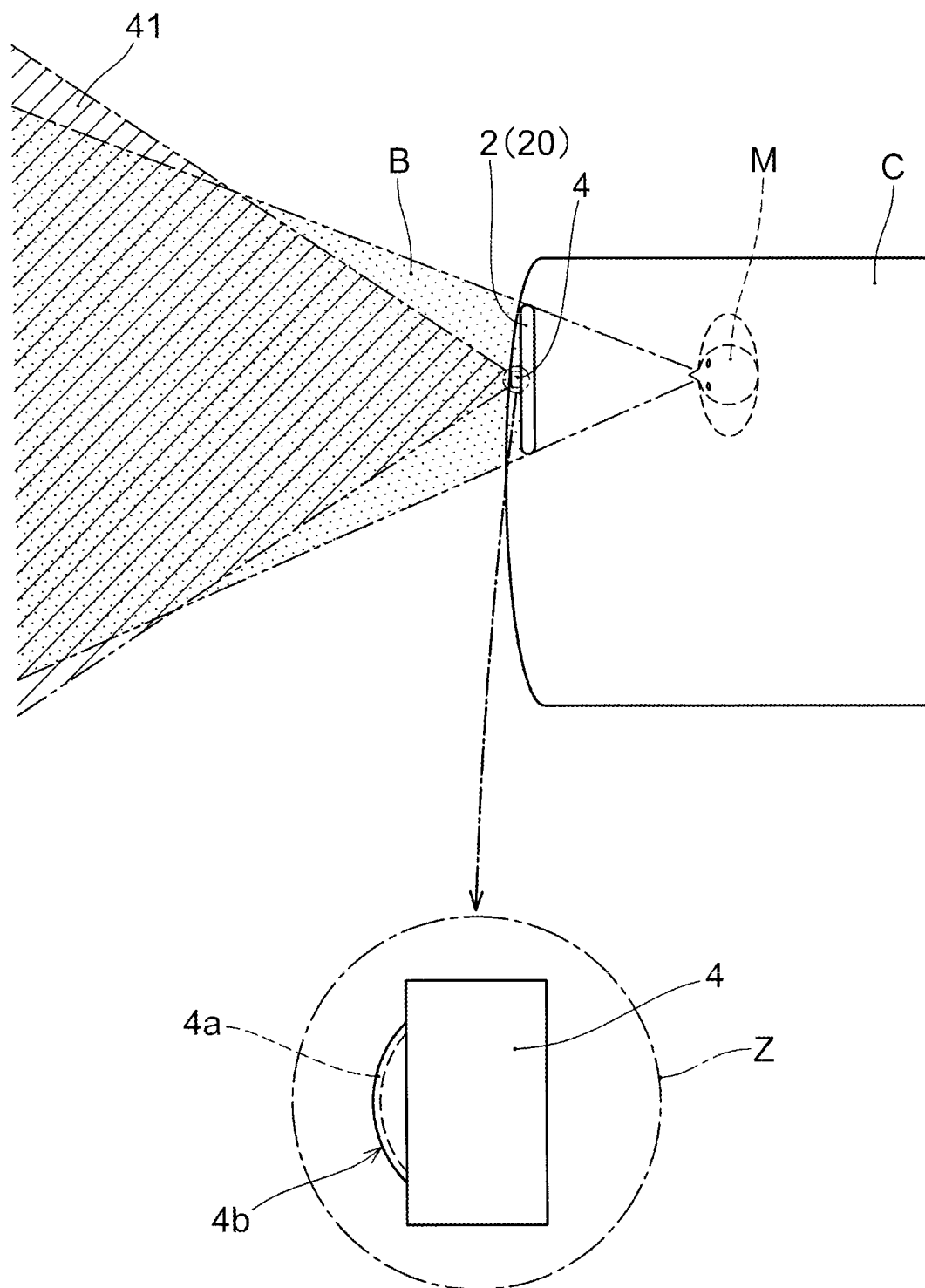
FIG. 4 schematically shows an example of a region picked up, as an image, by an image pickup device of the shading device according to the first embodiment, together with a blind spot portion of an operator.

As shown in FIG. 4, the image pickup device 4 is disposed in the motor vehicle C so as to pick up, as an image, an image pickup region 41 including a blind spot portion B obstructed by the dimming glass plate 20 of which light transmittance in the field of vision of the vehicular driver M is lowered. The region including the blind spot portion B is picked up, as an image, by the image pickup device 4 thus disposed and then the corresponding image pickup data is generated. The display image data based on the image pickup data is generated by the data processing circuit 5 (see FIG. 12) and, then, are sent to the display apparatus 3. Consequently, the image of the view including the region that can be the blind spot portion B can be displayed to face the vehicular driver M on the display apparatus 3 (see FIG. 1). The vehicular driver M can visually recognize, via the display apparatus 3, the view of the portion that is obstructed by the dimming glass plate 20 of which light transmittance is lowered. Thus, it is possible to reduce visual missing of traffic lights or a road sign by the vehicular driver M under such sunlight that the shading member 2 is used. It is considered that the shading device 1 of the embodiment can contribute to ensuring traffic safety.

Also, in the embodiment, even if the shading member 2 is positioned at a position in which the shading member 2 can be in the use state, as long as the light transmittance of the dimming glass plate 20 is set to be high, a blind spot is not produced in the field of vision of the vehicular driver M by the shading member 2. Therefore, the shading member 2 does not always need to be moved to the non-use position when the shading member 2 is not used. That is, movement of the shading member 2 is not necessarily required between when there is a need to obstruct sunlight and when there is no need to do so. When there is a need to obstruct sunlight, the sunlight can be obstructed or its intensity can be weakened merely by lowering the light transmittance of the dimming glass plate 20. Alternatively, when there is no need to obstruct sunlight, the view outside the motor vehicle to be seen in the position of the dimming glass plate 20 can be seen from the inside of the vehicular compartment merely by increasing light transmittance in the dimming glass plate 20. The inconvenience for the vehicular driver M or the like related to moving the shading device, which is required when the condition of incidence of sunlight varies according to a change of a vehicle cruising direction, is reduced.

In addition, thus, in the shading device 1 of the embodiment, in either of when the shading member 2 is used and when it is not used, no substantial blind spot is produced in the field of view of the vehicular driver or the like. Therefore, the shading member 2 can be formed not only in the vicinity of an upper edge of a windshield (the front windshield of the motor vehicle in examples of FIGS. 1 to 4), but also in a wider region, even in such a size as to cover an upper half region of the windshield as shown in FIG. 1 for example. Also, the sunlight illuminated by the sun that is relatively low can be obstructed by lowering the light transmittance of the dimming glass plate 20 while the field of vision is secured smoothly without any problem irrespective of whether the shading member 2 is used. In particular, the shading device 1 of the embodiment is preferred as a shading device for bus or truck or the like having a wide front windshield in a vertical direction.

In the embodiment, the image pickup device 4 is formed separately from the shading member 2, and is disposed inside the motor vehicle C. The image pickup device 4 is disposed so that the entirety of the blind spot portion B that can be produced by the dimming glass plate 20 of which light transmittance is lowered falls within the image pickup region 41 in a position which is as close to the vehicular driver M as possible. For example, a camera or the like provided with a lens having an angle of view capable of providing such image pickup region 41 is used as the image pickup device 4. Alternatively, the image pickup device 4 is disposed in a position at an angle which is suitable to obtain such image pickup region 41. In the image pickup device 4, as shown in FIG. 4, the vehicular driver M, the shading member 2, and the image pickup device 4 are preferably disposed in positions in which they are arranged on a substantially straight line in the longitudinal direction of the motor vehicle C, preferably at such an angle that a center of the blind spot portion B and a center of the image pickup region 41 are coincident with each other. As shown in FIG. 4, when the shading member 2 and the image pickup device 4 are disposed, even with the image pickup device 4 having a lens of which angle of view is narrow, the blind spot portion B easily falls within the image pickup region 41. In a case where the image pickup device 4 has appropriate durability and antifouling property against wind and rain, the image pickup device 4 can be disposed outside the vehicle.

The image pickup device 4 is construed to be not limitative to the positions shown in FIG. 4, and can be disposed in an arbitrary position in which it is possible to obtain an appropriate image pickup region 41. For example, the image pickup device 4 can be disposed at a central portion in the transverse direction of the front windshield of the motor vehicle C (in the widthwise direction of the motor vehicle C), for example, on a back surface (the surface facing the front of the motor vehicle C) of the "back mirror" (rearview mirror). The image pickup device 4 can be disposed in the vicinity of an edge in the transverse direction of the front windshield of the motor vehicle C or on a dashboard (not shown). It is preferable that antifouling coating using a photocatalyst effect such as titanium oxide be applied to at least a surface facing the outside of the vehicle of a portion facing an image pickup device 4 of the front windshield. The image pickup device 4 can also be disposed on the second surface 2b of the shading device 2. As described later, however, the shading member 2 can be used in an arbitrary position (angle) and thus it is preferable that the image pickup device 4 be disposed to be supported by an object other than the shading member 2 in terms of securing a stable image pickup region 41.

The image pickup device 4 is construed to be not limitative in particular as long as it is possible to pick up, as an image, a view of a desired image pickup region and then generate imaging data in a format that can be processed by the data processing circuit 5. As the image pickup device 4, for example, a digital camera or the like having a CCD image sensor or a CMOS image sensor is exemplified. The optical energy based on a view in an image pickup region is converted to electrical signals by light receiving elements disposed in a matrix inside the CCD image sensor or the like, and the imaging data based on these electrical signals is generated. Preferably, a camera or the like having an image sensor capable of color imaging is used as the image pickup device 4.

In FIG. 4, in a circle Z indicated by a chain line, the image pickup device 4 is schematically shown in an enlarged manner. The image pickup device 4 of the shading device 1 of the embodiment is provided with a lens 4b having a surface on which a coating layer 4a to reduce reflection of light by adjusting a refractive index is formed. The image pickup device 4 picks up, as an image, a view of a region which the second surface 2b illuminated by sunlight faces during use of the shading member 2. Therefore, the image pickup device 4 requires image acquisition against sunlight. The coating layer 4a is thus provided in the lens 4b of the image pickup device 4. By the coating layer 4a, an occurrence of flare or ghost, which is likely to occur in imaging against sunlight, can be suppressed. The coating layer 4a can be formed by forming a large number of wedge-shaped structures of nano-size on a surface of the lens 4b or forming a layer of particulates of nano-size on the surface of the lens 4b. The image pickup device 4 does not necessarily need to be provided with the lens having the coating layer 4a.

Figure 5A:
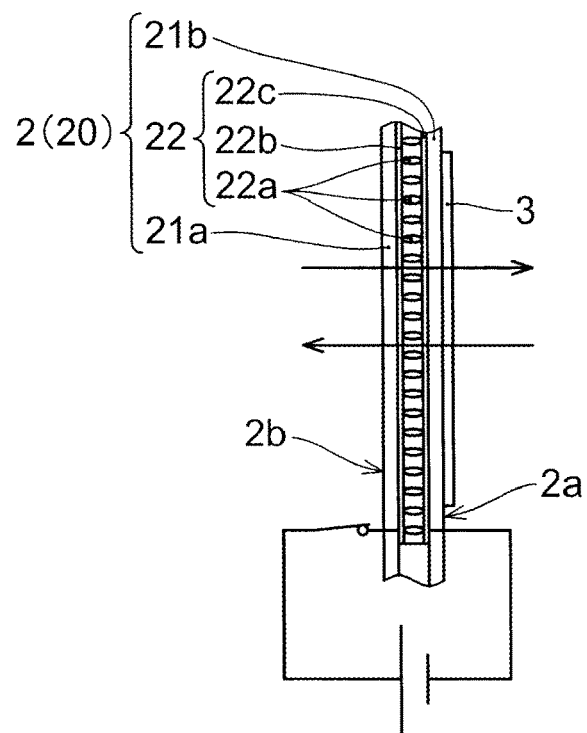
FIG. 5A shows an operation of a dimming glass plate of the shading device according to the first embodiment.
Figure 5B:
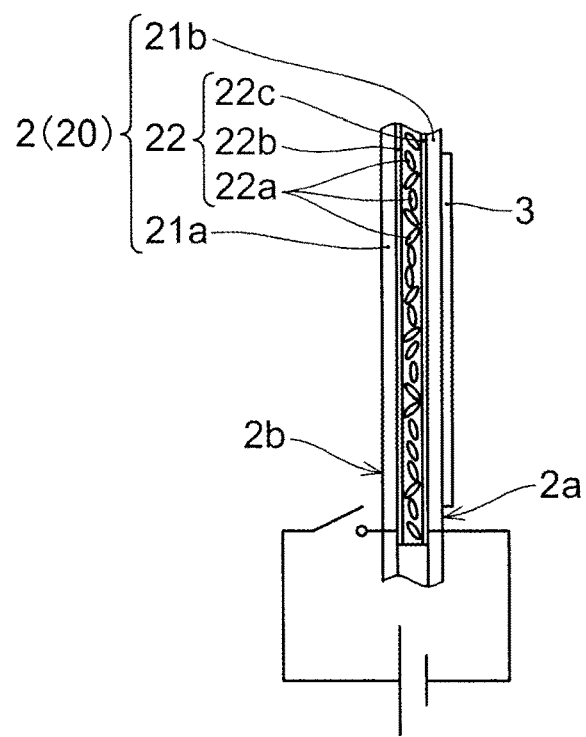
FIG. 5B shows an operation of the dimming glass plate of the shading device according to the first embodiment.

Referring to FIG. 5A and FIG. 5B, an operation of the dimming glass plate 20 will be described. In FIG. 5A and FIG. 5B, a cross-sectional structure of the dimming glass plate 20 is schematically shown. As shown in FIG. 5A and FIG. 5B, the dimming glass plate 20, specifically in addition to the two glass plates 21a, 21b mentioned previously, includes: two conductive films 22b, 22c that allow light to pass therethrough; and liquid crystal molecules 22a sealed in between the two conductive films 22b, 22c. A liquid crystal sheet 22 is composed of the conductive films 22b, 22c and the plurality of liquid crystal molecules 22a.

Although a float glass is shown as a type of the glass plates 21a, 21b, the type of the glass plates 21a, 21b is construed to be not limited in particular as long as it has certain light transmissibility. In general, although an inorganic glass is preferably used in the glass plates 21a, 21b, an organic glass can be used in the glass plates 21a, 21b, for example, a plastic plate having light transmissibility such as an acrylic glass can be used. A material for the conductive films 22b, 22c is construed to be not limited in particular as long as it has light transmissibility and conductivity as well. For example, indium tin oxide (ITO) or zinc oxide or the like can be used in the conductive film 22b, 22c. As described later, the display apparatus 3 is preferably an organic EL display panel. In the display apparatus 3, an organic material can be included. In order to reduce stress relative to an organic material caused by ultraviolet ray or heat, it is preferable that the dimming glass plate 20 have light shielding property relative to ultraviolet ray and/or infrared ray. For example, between the two glass plates 21a and 21b, an intermediate film (not shown), which absorbs an ultraviolet ray or an infrared ray, can be provided. Alternatively, on a surface of the dimming glass plate 20 that constitutes the second face 2b of the shading member 2, a layer to obstruct and/or reflect an ultraviolet ray and/or an infrared ray can be formed. In a case where a plastic plate is used as the glass plates 21a, 21b of the dimming glass plate 20, in particular, it is preferable to form, on the second surface 2b, a layer to obstruct and/or reflect an ultraviolet ray and/or an infrared ray.

The liquid crystal molecules 22a have an elliptical shape. As shown in FIG. 5A, when a voltage of a given magnitude is applied between the conductive layer 22b and the conductive layer 22c, the plurality of liquid crystal molecules 22a are oriented in a direction which is substantially parallel to a thickness direction of the dimming glass plate 20. Consequently, light can transmit the dimming glass plate 20.

Alternatively, as shown in FIG. 5B, when a voltage is not applied to the conductive films 22b, 22c, the plurality of liquid crystal molecules 22a are present in the liquid crystal sheet 22 while their own elliptical shapes are respectively oriented in an arbitrary direction. In the state shown in FIG. 5B, sunlight is obstructed by the dimming glass plate 20 (specifically, liquid crystal molecule 22a). The orientation property of the plurality of liquid crystal molecules 22a varies based on the magnitude of the voltage that is applied between the conductive film 22b and the conductive film 22c. Therefore, the light transmittance in the diming glass plate 20 can be controlled by controlling the magnitude of the voltage that is applied between the conductive film 22b and the conductive film 22c.

The shading device 1 of the embodiment can be further provided with a control circuit 7 (see FIG. 12) that controls an ON/OFF state of the display apparatus 3 based on the light transmittance in the dimming glass plate 20. When sunlight is obstructed by the dimming glass plate 20, it is possible to reduce operations performed by the vehicular driver or the like required to cause the display apparatus 3 to display the view of the portion obstructed by the dimming glass plate 20. For example, the shading device 1 can be further provided with a comparator for dimming glass plate (not shown), which that compares the voltage actually applied to the dimming glass plate 20 and a voltage which provides the given light transmittance into the dimming glass plate 20, with each other. In addition, based on an output of the comparator for dimming glass plate, the ON state and the OFF state of the display apparatus 3 can be switched by the control circuit 7. Further, on each of the first surface 2a and the second surface 2b of the shading member 2, an illuminance sensor (not shown) or the like capable of detecting intensity of light can be provided. In a case where a difference in output between the two illuminance sensors is smaller than a given reference value, the display apparatus 3 can be controlled to the OFF state by the control circuit 7, or, alternatively, when the above difference is greater than the reference value, the display apparatus 3 can be controlled to the ON state. The display apparatus 3 is thus controlled, whereby, when the light transmittance in the dimming glass plate 20 is lower than the given reference value, the display apparatus 3 turns to the ON state and then an image is displayed on the display apparatus 3.

Again, referring to FIG. 2 and FIG. 3, the shading member 2 and the display apparatus 3 will be described in further detail. The shading member 2 has a plate-like shape, and the shape in the first surface 2a and the second surface 2b has a substantially rectangular shape as a whole. An engaging member F2 is provided at each of end portions on both the left and right of one end edge 2d1 of two end edges 2d1, 2d2 that are substantially parallel in the longitudinal direction in the shading member 2. The shading member 2 is attached to an upper portion (for example, the ceiling portion of the motor vehicle C) of a windshield via the engaging member F2 and a supporting member F1 so that the end edge 2d1 is present on an upper side during use of the shading member 2.

Figure 12:
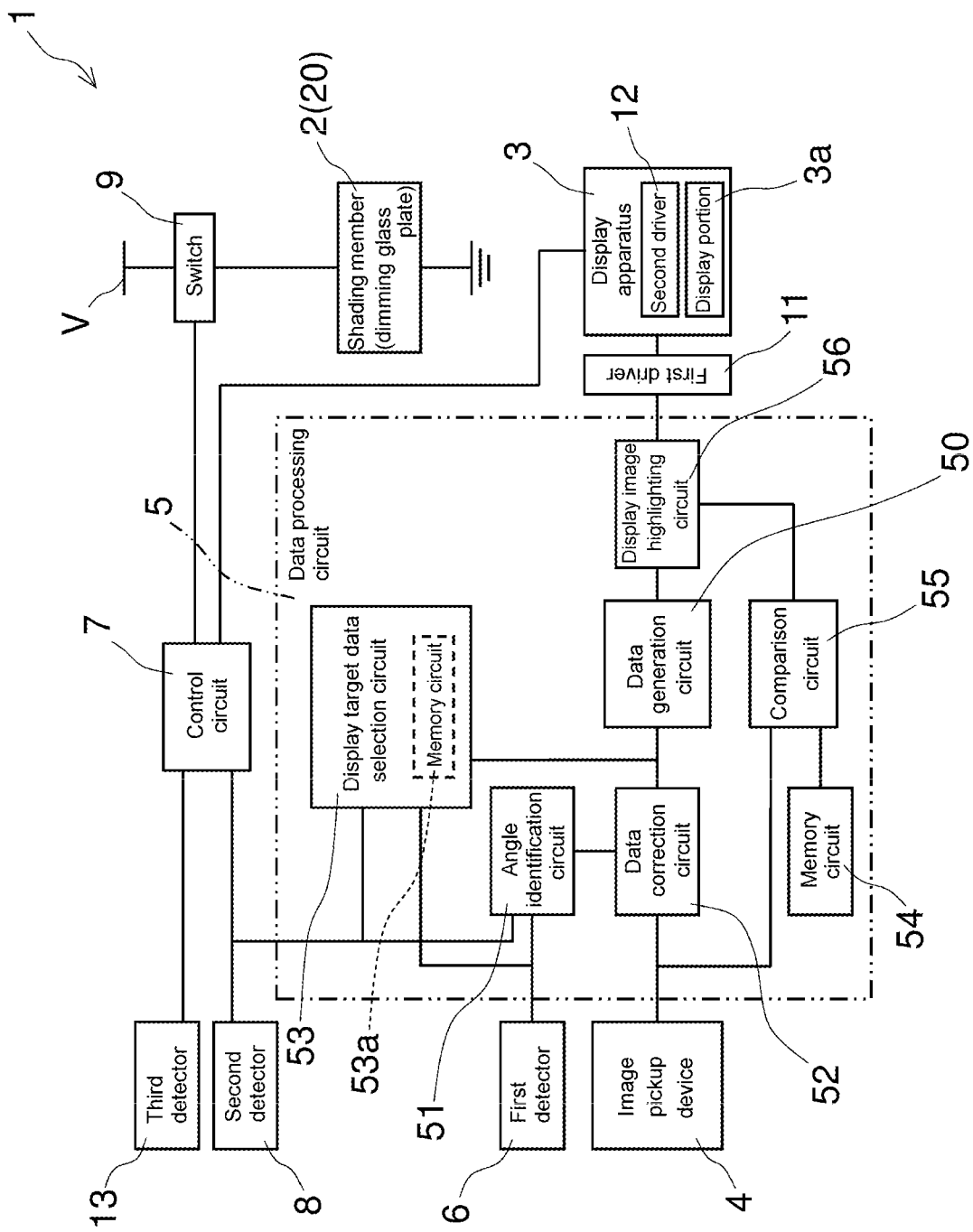
FIG. 12 shows a block diagram of essential constituent elements of the shading device according to the first embodiment.

The display apparatus 3 is formed of a light transmissible material, and causes the display portion 3a to display an image based on the display image data generated by the data processing circuit 5 (see FIG. 12). The display apparatus 3 is construed to be not limited in particular as long as it has such an image display function and can be composed of a light transmissible material. Although an organic EL display panel or a liquid crystal display panel capable of being formed in a thin shape is shown as the display apparatus 3, an organic EL display panel, which does not require, in principle, a color filter or backlight which can be an element lowering light transmissibility, is preferred as the display apparatus 3, in particular.

The display apparatus 3 is fixed to the shading member 2 by the Optical Clear Adhesive (OCA) provided in a sheet-like state. In place of the OCA, the display apparatus 3 can be bonded to the shading member 2 using the Optical Clear Resin (OCR) that is hardened by means of UV irradiation. However, means for fixing the display apparatus 3 to the shading member 2 is construed to be not limited thereto.

Figure 6:
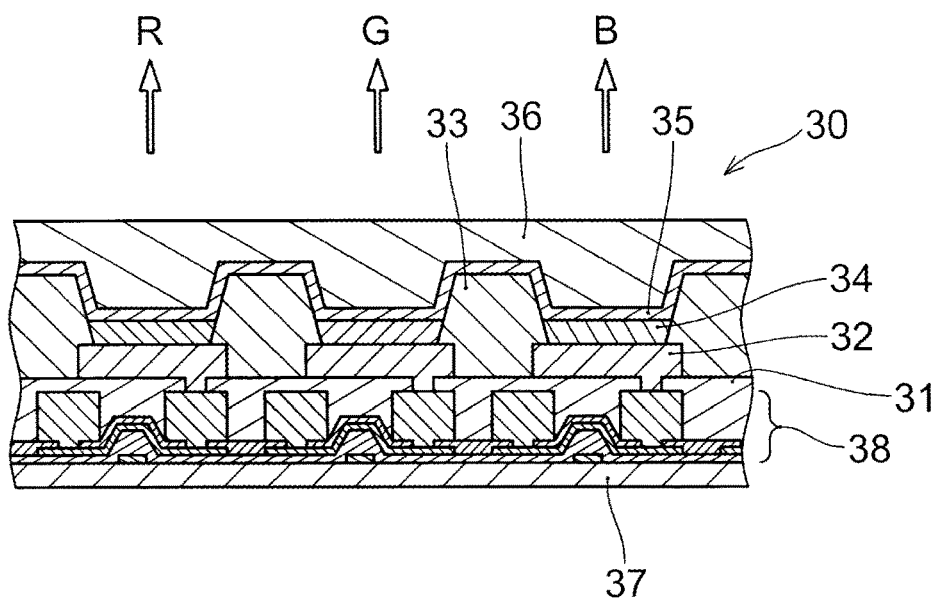
FIG. 6 shows a cross-sectional structure for one pixel of the display apparatus in the shading device according to the first embodiment.

In FIG. 6, the cross-sectional view for one pixel of the organic EL display panel 30 that can constitute the display apparatus 3 is shown. On a flexible film 37 made of a resin or the like, a switching element such as TFT 38 is formed for each of subsidiary pixels R, G, B, and, on a planarizing film 31 formed thereon, a first electrode (for example, anode) 32 is formed. The flexible film 37 is formed of a transparent polyimide resin, for example. The first electrode 32 is also formed of a conductive material having light transmissibility, such as ITO film, for example, and is connected to the switching element such as TFT 38. The TFT 38 is formed of a transparent amorphous oxide semiconductor such as oxide made of indium, gallium, and zinc, for example. The TFT 38 does not necessarily need to be formed of a light transmissible material, and the TFT 38 can be formed using low temperature polysilicon (LTPS) outside individual pixel regions, for example. The TFT 38 can also be formed using an organic semiconductor material such as pentacene, copper phthalocyanine, or fluorinated phthalocyanine having more extensibility than an inorganic semiconductor material. In addition, in place of the flexible film 37, a light transmissible plate material having rigidity, such as a glass plate, can be used as a base material.

In between the subpixels, an insulation bank 33 made of SiO2 is formed. An organic layer 34 is vapor-deposited in a region surrounded by the insulation bank 33. Although the organic layer 34 is shown as one layer in FIG. 6, the organic layer 34 can be actually formed of a plurality of layers of laminate film that are made of different organic materials.

On the organic layer 34, a second electrode (for example, cathode) 35 is formed using vapor deposition technique or the like so as to have transparency by forming an Mg—Ag alloy layer or an alkaline metal layer so as to be sufficiently thinner than a light wavelength, for example. Further, on a surface of the second electrode 35, a passivation layer 36 made of Si3N4 or the like, for example, is formed. Each element shown in FIG. 6 is entirely sealed with a sealing layer made of a resin film, which is not shown, so that the organic layer 34 or the second electrode 35 does not absorb moisture or oxygen or the like. The cross-sectional structure shown in FIG. 6 is merely provided as an example, and the structure of the organic EL display panel 30 that constitutes the display apparatus 3 and the materials for the respective constituent elements are construed to be not limited to the structure and materials described herein.

In the organic EL display panel 30 that is used in the shading device 1 of the embodiment, the first electrode 32 and the second electrode 35 are formed at substantially equal intervals in all of the respective subsidiary pixels R, G, B. In other words, the first electrode 32 and the second electrode 35 are not intentionally differentiated from each other as to the intervals between these two electrodes for subpixel of each color. On the other hand, in a general organic EL display panel, to increase the intensity of the light radiated in a vertical direction to a display surface of the panel, the intervals between the anode and the cathode of each subpixel and the light wavelength of the color that the subpixel emits are made coincident with each other so that the light emitted from the organic layer repeats reflection between the anode and the cathode (micro-cavity structure). That is, in the general organic EL display panel, the intervals between the anode and the cathode are respectively different from each other for subpixel of each color.

On the contrary, in the shading device 1 of the embodiment, the display apparatus 3 can be seen by the vehicular driver or the like at an arbitrary angle. Therefore, it is not required in particular to increase the intensity of the light radiated in the vertical direction to the display surface of the display apparatus 3, and it is more important to make the angle-of-view dependencies of the respective colors R, G, B coincident with each other so that chromaticity does not greatly change even if an angle varies. Thus, the first electrode 32 and the second electrode 35 of the organic EL display panel 30 that is used in the shading device 1 of the embodiment do not utilize a micro-cavity effect, unlike the general organic EL display panel. For example, the first electrode 32 and the second electrode 35 can be spaced from each other by substantially equal distances among the subpixels of colors R, G, B. In other words, the intervals between the cathode and the anode in each subpixel do not have to be coincident with the wavelength of the light that the subpixel emits. That is, the organic EL display panel 30 can include a plurality of subpixels, and each of the plurality of subpixels can include two electrodes disposed at intervals of lengths which are different from the wavelength of the light that each of the plurality of subsidiary pixels emits.

Figure 7:
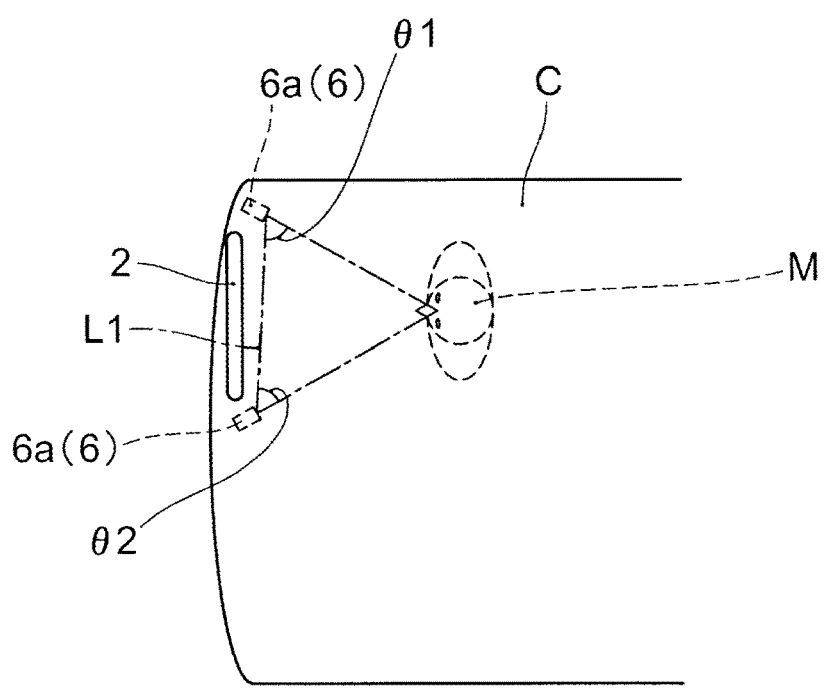
FIG. 7 shows an example of a first detector of the shading device according to the first embodiment.

The shading device 1 of the embodiment can be further provided with a detector (first detector 6) that detects the positions of the eyes of the operator (the vehicular driver M in the embodiment) of the shading member 2. The first detector 6, as shown in FIG. 7, is composed of: eye detection cameras 6a, 6b that are respectively installed in two known positions; and an analyzing device (not shown) that analyzes picked up images of the eye detection cameras 6a, 6b, for example. The eye detection cameras 6a, 6b are provided with a far infrared-ray sensor, and generate temperature data of each portion in the pickup region. The eyeballs of an ordinary person are characterized by a lower temperature than any other portion in the face. The analyzing device (not shown), based on the temperature data generated by the eye detection cameras 6a, 6b, specifies the facial position and further the positions of the eyes of the vehicular driver M in the picked-up images by the eye detection cameras 6a, 6b. A general digital camera can be used as the eye detection cameras 6a, 6b, and the positions of the eyes can be specified by image recognition in the analyzing device (not shown).

The positions of the eyes of the vehicular driver M in the picked-up images by the eye detection cameras 6a, 6b are specified, whereby angles θ1, θ2 formed between a straight line L1 connecting the two eye detection cameras 6a, 6b in the known positions and a straight line connecting the respective eye detection cameras 6a, 6b and the eyes of the vehicular driver M are specified. In addition, based on a length of the straight line L1 and the angles θ1, θ2, the positions of the eyes of the vehicular driver M relative to the eye detection cameras 6a, 6b are specified using trigonometry. Only a position of either one of the both eyes of the vehicular driver M can be specified or the positions of the both eyes can be respectively specified. In a case where the positions of the two eyes are specified, for example, a position of a midpoint connecting the line connecting the both eyes is calculated, and the position of the midpoint is handled as the positions of the eyes of the vehicular driver M. Also, in a case where either one eye is preferentially used at the time of driving (such as a case in which the other eye of vehicular driver M is injured or a case in which an attempt is made to visually recognize an image with the dominant eye, for example), it is preferable that the shading device 1 of the embodiment have an auxiliary portion that switches the setting from a setting based on the both eyes to a setting based on one eye, and that specifies which one of the right eye and the left eye is to be used, and the information input to the auxiliary portion is used for data processing by a display target data selection circuit 53, which will be described later. The eye detection cameras 6a, 6b are disposed on a one-by-one camera basis in a pillar of the motor vehicle C or in the vicinity of the front windshield at a central portion in the widthwise direction. However, the eye detection cameras 6a, 6b are construed to be not limited to the setting position shown in FIG. 7, and can be provided in an arbitrary position in which the positions of the eyes of the vehicular driver M can be detected. A method of utilizing a result of detection of the first detector 6 will be described later.

Figure 8A:
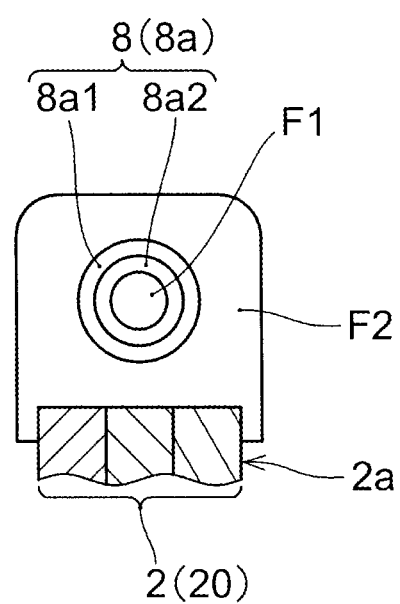
FIG. 8A shows an example of a second detector of the shading device according to the first embodiment.
Figure 8B:
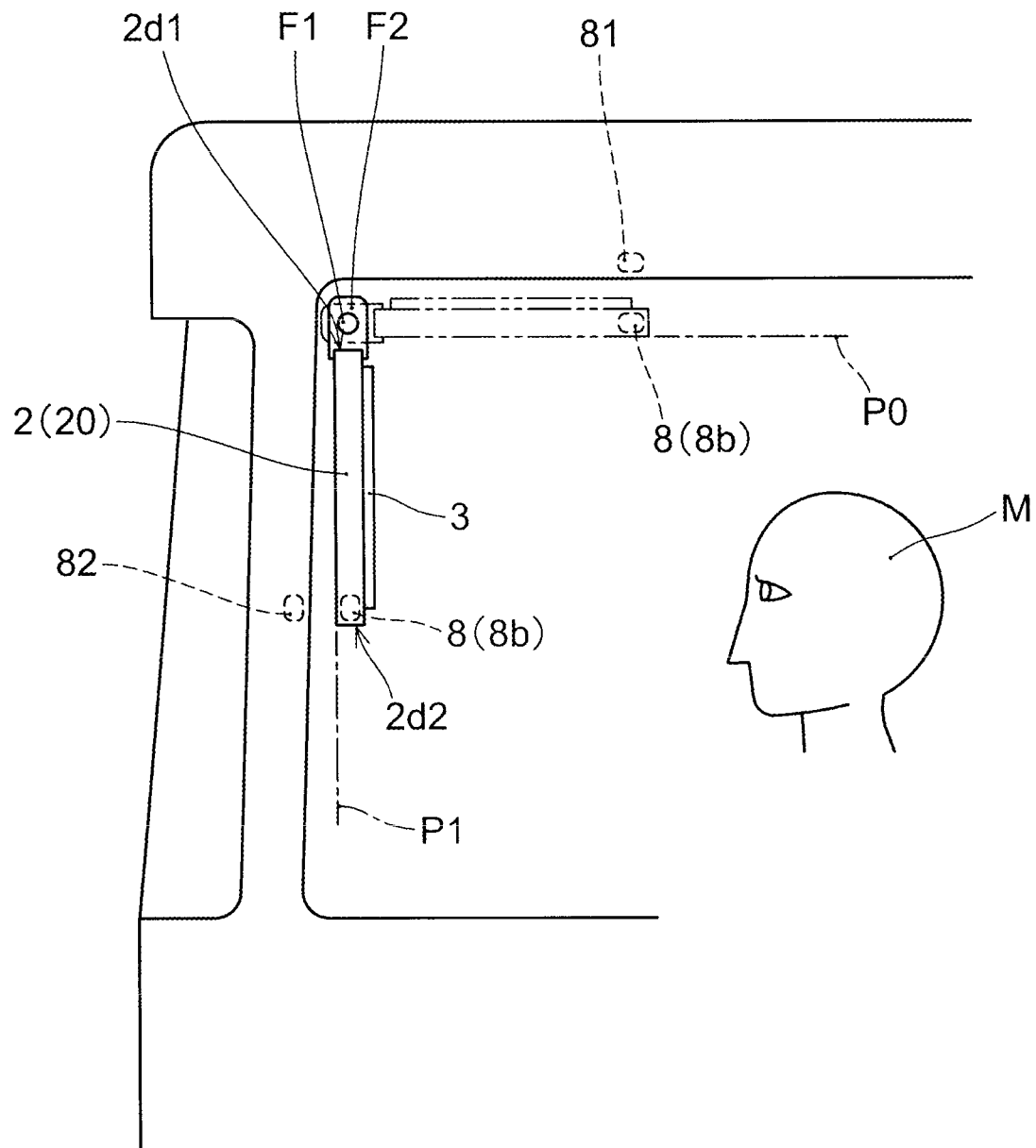
FIG. 8B shows another example of the second detector of the shading device according to the first embodiment.

The shading device 1 of the embodiment, as shown in FIG. 8A and FIG. 8B, can be further provided with a detector (second detector 8) that detects a position of the shading member 2. The second detector 8 detects the position of the shading member 2 so as to identify at least the use state and the non-use state of the shading member 2. The second detector 8 preferably detects an angle of the first surface 2a of the shading member 2 (angle relative to the vertical direction of the motor vehicle C) to thereby detect the position of the shading member 2.

In FIG. 8A, an angle sensor 8a is shown as an example of the second detector 8. In the example of FIG. 8A, the angle sensor 8a is a rotation angle detection sensor using a rotary potentiometer. The angle sensor 8a of FIG. 8A has: a movable portion 8a1 rotating together with the shading member 2 and the engaging member F2 about the supporting member F1; and a fixing portion 8a2 fixed to the supporting member F1, and is disposed at an engagement portion between the supporting member F1 and the engaging member F2. The angle sensor 8a detects a positional difference in the circumferential direction about the supporting member F1 between the fixing portion 8a2 and the movable portion 8a1 rotating together with the shading member 2 to thereby detect an angle of the shading member 2, that is, a position in the rotating direction.

In an example shown in FIG. 8B, the shading member 2 is provided with a magnetic sensor 8b as the second detector 8 in the vicinity of an end edge 2d2 opposite an end edge 2d1 to which the engaging member F2 is attached. In FIG. 8B, an example of the use state of the shading member 2 is shown as a view from a lateral side of the vehicular driver M. The shading member 2 is rotatably linked to the supporting member F1 using the engaging member F2. The shading member 2 is rotated about the supporting member F1, and is thereby variably positioned from a non-use position P0 that is a position in which the shading member is not used; to a use position such as a use position P1. The use position P1 is merely provided as an example of the use position of the shading member 2, and the shading member 2 can be used in an arbitrary position in which at least portion of the sunlight illuminating the vehicular compartment can be obstructed As shown in FIG. 8B, when the shading member 2 is present in the non-use position P0, a magnet 81 is disposed in a position which is proximal to a magnetic sensor 8b. Also, when the shading member 2 is present in a position to rotate farthest from the non-use position P0 about the supporting member F1 (the use position P1 in the example of FIG. 8B), a magnet 82 is disposed in a position which is proximal to the magnetic sensor 8b. The magnets 81, 82 can be disposed on a surface of an interior material that constitute the ceiling portion of the vehicular compartment or its back or on a surface or inside a pillar, for example.

The magnets 81, 82 are disposed with a same magnetic pole (N pole or S pole) oriented to the magnetic sensor 8b, for example. The magnetic sensor 8b moves in the magnetic field produced by the magnet 81 and the magnet 82 concurrently with rotating of the shading member 2. The magnetic sensor 8b detects the orientation and intensity of the magnetic field in its own position, and electrically outputs a result of detection, for example. By using the magnetic sensor 8b and magnets 81, 82, it is possible to detect whether the shading member 2 is present in the non-use position P0 or in a given use position, for example, the use position P1. The magnetic sensor 8b can be composed of a Hall element or a mere magnetic coil or the like, for example. It suffices that the second detector 8 can detect the position of the shading member 2, and this detector is construed to be not limited to the examples shown in FIG. 8A and FIG. 8B. For example, a magnet can be disposed in the position of the magnetic sensor 8b in FIG. 8B, and a magnetic sensor can be provided as the second detector 8 in each of the positions of the magnets 81, 82. Alternatively, either one of the magnets 81, 82 can be disposed.

In a case where the second detector 8 is provided, the shading device 1 is preferably provided with the control circuit 7 (see FIG. 12) mentioned previously, and the second detector 8 is connected to the control circuit 7. In this case, the control circuit 7 can determine at least whether the shading member 2 is present in a use position based on a result of detection of the second detector 8. In addition, the control circuit 7 can control the ON/OFF state of the display apparatus 3 based on the light transmittance of the dimming glass plate 20 and the result of detection of the second detector 8.

For example, when the light transmittance of the dimming glass plate 20 is equal to or greater than the predetermined reference value, sunlight is not obstructed and, thus, the control circuit 7 determines that image display on the display apparatus 3 is not required, and can control the display apparatus 3 to the OFF state irrespective of the position of the shading member 2. Alternatively, when the light transmittance of the dimming glass plate 20 is lower than the predetermined reference value, the control circuit 7 can control the ON/OFF state of the display apparatus 3 based on the result of detection of the second detector 8. For example, if the result of detection of the second detector 8 shows that the shading member 2 is present in a position which is farther from the non-use position P0 than the given position, the control circuit 7 can determine that the shading member 2 is present in a use position. Alternatively, in a case where the display apparatus 3 is present in the OFF state at that time, the control circuit 7 can control the display apparatus 3 to the ON state to thereby cause the display apparatus 3 to display an image. Also, if the result of detection of the second detector 8 shows that the shading member 2 is closer to the non-use position P0 than the given position, the control circuit 7 can determine that the shading member 2 is present in the non-use position. In a case where the display apparatus 3 is present in the ON state, the control circuit 7 can control the display 3 to the OFF state to thereby stop image display. The shading device 1 has such a construction, whereby the vehicular driver M can cause the display apparatus 3 to display an image or stop the display merely by operating the shading member 2 and/or changing the light transmittance of the dimming glass plate 20.

The second detector 8 is construed to be not limited to the angle sensor 8a or the magnetic sensor 8b, and can be an arbitrary detector such as a gravity sensor capable of detecting an event varying based on the position (angle) of the shading member 2. The second detector 8 does not necessarily need to be provided. That is, the ON/OFF control of the display apparatus 3 can be performed by the operator of the shading member 2.

The transmittance of the dimming glass plate 20 and image display on the display apparatus 3 do not necessarily need to be linked to each other. For example, when the transmittance of the dimming glass plate 20 is high, an image can be displayed on the display apparatus 3. In a situation in which the exterior of the vehicle is dark, such as nighttime, for example, even in a state in which the transmittance of the light of the dimming glass plate 20 is high, the display apparatus 3 can display an image which can sufficiently be visually recognizable to the vehicular driver. In such a case, arbitrary information can be displayed on the display apparatus 3. Alternatively, in a state in which an object to be visually recognized is absent at a portion obstructed by the dimming glass plate 20 of which light transmittance is lowered, the display apparatus 3 can be set to the OFF state irrespective of whether the transmittance of the light of the dimming glass plate 20 is high or low.

Figure 9A:
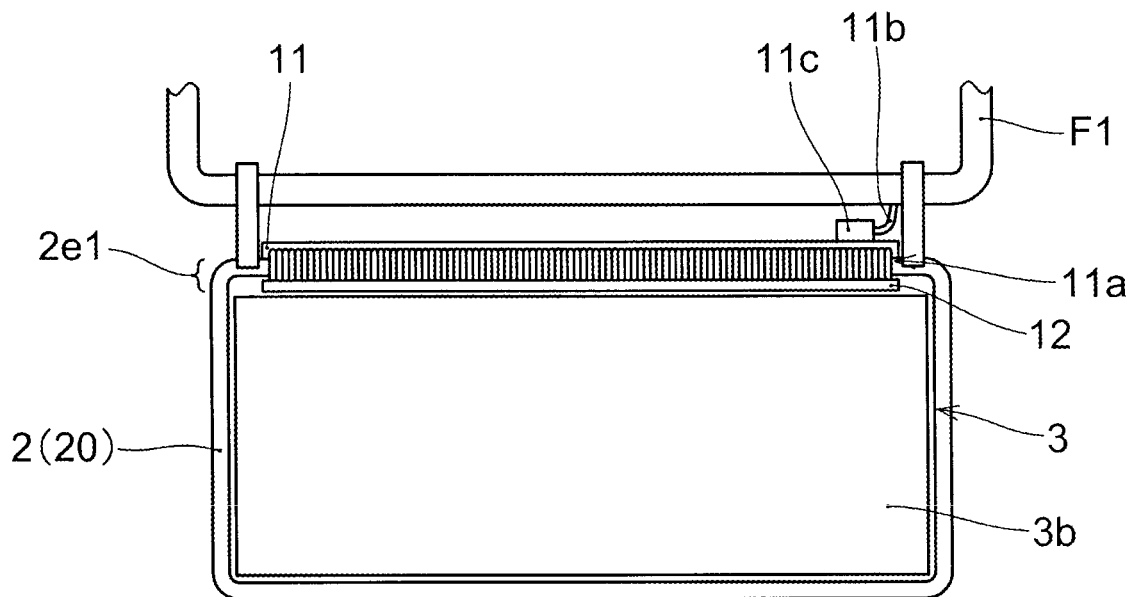
FIG. 9A shows a front view of an example of a layout of each driver of the shading device according to the first embodiment.
Figure 9B:
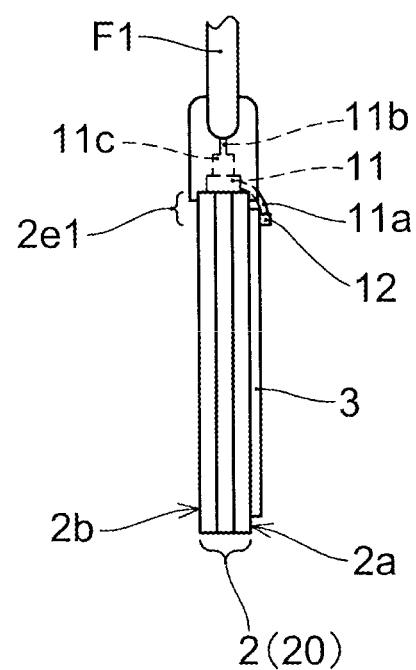
FIG. 9B shows a side view of an example of the layout of each driver of the shading device according to the first embodiment.

The shading device 1 of the embodiment, as shown in FIG. 9A and FIG. 9B, can be further provided with a driver (first driver 11) provided separately from the display apparatus 3 and outputting a signal used to drive the pixels of the display apparatus 3. The first driver 11 outputs a signal for driving the pixels of the display apparatus 3, based on the display image data generated by the data processing circuit 5 (see FIG. 12). The first driver 11 can be composed of a display apparatus driver IC and a mounting board for the display apparatus driver IC, for example. By the first driver 11, for example, a source signal or a gate signal required for image display on the display apparatus 3 is generated with an appropriate timing, and is output as an output signal.

The display apparatus 3 can also be provided with a driver (second driver 12) that drives the pixels of the display apparatus 3 based on an output signal of the first driver 11. The second driver 12 is formed on a surface of the display apparatus 3 and inside thereof, for example. The second driver 12, like TFT 38 (see FIG. 6) of the display apparatus 3, can be composed of a plurality of transistors formed inside the display apparatus 3 (in FIG. 9A and FIG. 9B and FIG. 10A to FIG. 11 which will be described later, for the sake of clarity, on the surface of the display apparatus 3, the second driver 12 is schematically shown with a thickness and a length of a short edge direction being drawn in an exaggerated manner).

The first driver 11 and the second driver 12 are connected to each other by way of wiring 11a. The wiring 11a is a conductor pattern that constitutes a flexible printed wiring board, for example. Although not shown, the second driver 12 is connected to a TFT 38 for each pixel of the display apparatus 3 by way of wiring formed in the display apparatus 3. The wiring (not shown), which connects the second driver 12 and the TFT 38 of each pixel to each other, is provided in a plurality according to the number of columns or the number of rows of a plurality of pixels arranged in a matrix manner in the display apparatus 3.

On the other hand, the driver 11 is connected by way of a conductive wire 11b to the data processing circuit 5 (see FIG. 12) or an arbitrary relay circuit (not shown) provided between the data processing circuit 5 and the first driver 11. The conductive wire 11b can be composed of a plurality of conductive wires arranged in parallel, or bundled. In examples of FIG. 9A and FIG. 9B, the conductive wire 11b is inserted into the supporting member F1 formed using a tubular material. The first driver 11 is provided with a connection portion 11c relative to the conductive wire 11b. The first driver 11 and the conductive wire 11b, in the connecting portion 11c, can be connected to each other by thermocompression bonding using an amorphous conductive film or the like, soldering, or fitting of a connector, or the like.

By the first driver 11, a driving signal according to the columns or rows of each pixel of the display apparatus 3 is generated. Thus, in between the first driver 11 and the second driver 12, a large number of wirings 11a are connected according to the number of columns or the number of rows of the pixels in the display apparatus 3. However, the first driver 11 and the data processing circuit 5 (see FIG. 12) can be connected by about several tens of conductor wires 11b. Therefore, without using a relatively expensive flexible printed wiring board or the like, it is possible to connect the first driver 11 and the data processing circuit 5 or the like with a plurality of conductive wires 11b individually formed of a single wire or stranded wire. In addition, a degree of freedom in design related to a connection structure between the data processing circuit 5 and the first driver 11 is improved as well.

In the examples of FIG. 9A and FIG. 9B, the display apparatus 3 is provided with a substantially rectangular display screen 3b, and the first driver 11 is disposed at a first edge portion 2e1 along the longitudinal direction of the display screen 3b at an edge portion of the shading member 2. The first edge portion 2e1 is an end edge of the shading member 2 to be oriented to an upper side (for example, the ceiling portion of the vehicular compartment of the motor vehicle C in the example of FIG. 1) during use of the shading device 2 and a proximal portion thereof. The first driver 11, as described previously, is composed of a display apparatus driver IC or the like that does not necessarily have light transmissibility and, thus, a blind spot can be produced in the field of vision of the operator of the shading member 2. However, the first driver 11 is disposed at the first edge portion 2e1 of the shading member 2, and a blind spot which can be produced in the field of vision of the vehicular driver can be thereby limited to only an upper edge portion of a windshield such as a front windshield. Movement of the line of vision of a person is smoother in the horizontal direction than in the vertical direction and, thus, it is considered that, even if an interruption of the field of vision in the vertical direction is present, it is more difficult to make the vehicular driver feel an interrupted impression.

Also, in the examples of FIG. 9A and FIG. 9B, the first driver 11 is disposed on a side surface of the first edge portion 2e1 of the shading member 2. Thus, in a case where the first driver 11 has a flat shape, it is preferable that the first driver 11 be thus disposed on the side surface of the shading member 2 so as to orient the side surface to the vehicular driver or the like in terms of the fact that it is possible to reduce blind spots which can be produced by the first driver 11. However, the first driver 11 can be disposed on the first surface 2a or the second surface 2b of the shading member 2.

Further, if the first driver 11 is disposed at the edge portion along the longitudinal direction of the display screen 3b, the number of pixels to which a driving signal is to be sent by each of the driving elements constituting the first driver 11 is reduced. Consequently, it is possible to reduce a length of wiring (including wiring 11a and the internal wiring of the display apparatus 3) between the first driver 11 and the farthest pixel from the first driver 11. It is also possible to reduce a voltage drop in each wiring or heat dissipation caused by conductor resistance. In a case where an organic EL display panel of electric current driving type is used in the display apparatus 3, in particular, it is preferable to dispose the first driver 11 and the second driver 12 as shown in FIG. 9A or the like.

Figure 10A:
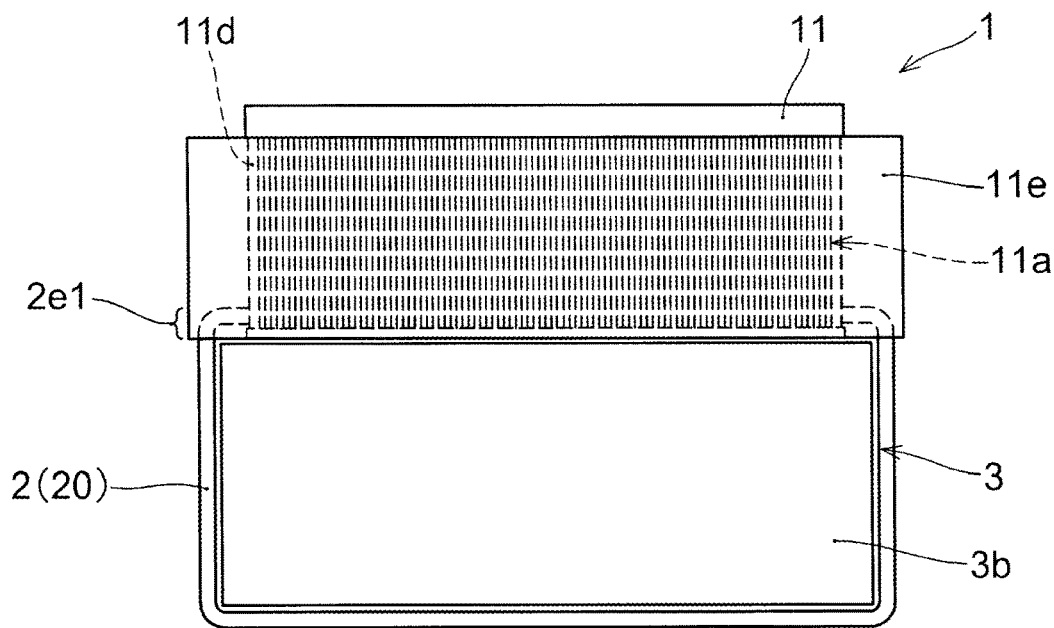
FIG. 10A shows a front view of another example of the layout of each driver of the shading device according to the first embodiment.
Figure 10B:
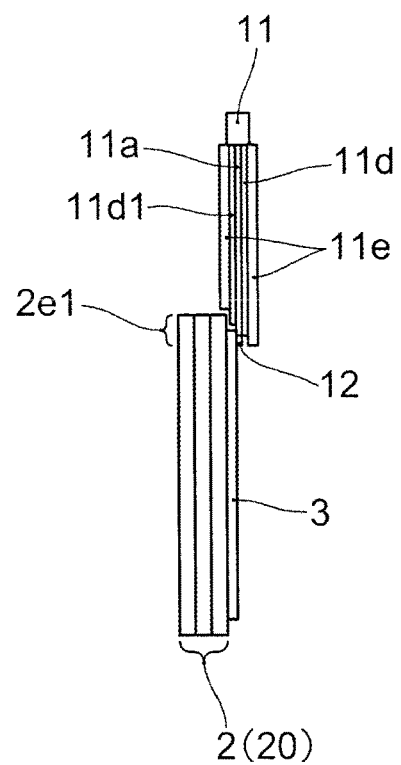
FIG. 10B shows a side view of still another example of the layout of each driver of the shading device according to the first embodiment.

The first driver 11, as shown in FIG. 10A and FIG. 10B, can be provided to be spaced from the shading member 2. It is possible to reliably prevent a blind spot from being produced by the first driver 11. In examples of FIG. 10A and FIG. 10B, the shading device 1 is provided with a flexible film 11d provided with the wiring 11a, and the first driver 11 and the display apparatus 3 are connected to each other by way of the wiring 11a. The flexible film 11d is connected to a portion along the longitudinal direction of the display screen 3b at an edge of the display apparatus 3 provided with the substantially rectangular display screen 3b. Also, the flexible film 11d, in a relationship with the shading member 2 is connected to the display apparatus 3 at the first edge 2e1 of the shading member 2 along the longitudinal direction of the display screen 3b to be oriented to an upper side during use of the shading member 2. As in an example shown in FIG. 9A or the like, it is possible to reduce a length of wiring between the first driver 11 and the farthest pixel from the first driver 11. The flexible film 11d is connected by way of thermocompression bonding or the like using an amorphous conductive film (not shown), for example, and preferably, the connection position is covered with an epoxy resin or the like.

The flexible film 11d is formed using a polyimide resin, for example, and a flexible printed wiring board is composed of the flexible film 11d and the wiring 11a. Even if the shading member 2 rotates, connection between the first driver 11 and the display apparatus 3 is normally maintained by way of the wiring 11a that is supported by the flexible film 11d. In the example of FIG. 10B, a coverlay 11d1 to protect the wiring 11a is provided at the flexible printed wiring board. The first driver 11 can be disposed between an interior material (not shown) that constitute the ceiling portion of the vehicular compartment of the motor vehicle C (see FIG. 1) and exterior plates that constitute a roof of the vehicle (motor vehicle C).

A surface of the flexible film 11d can be covered with an opaque covering member which is flexible or which is bendable in at least one position. In FIG. 10A and FIG. 10B, the surface of the flexible film 11d is covered with a covering member 11e. The flexible film 11d, as described previously, is formed of polyimide or the like and, thus, generally exhibits dark brown, and it is considered that aesthetic sense is not provided to the vehicular driver or the like in particular. However, the flexible film 11d is provided with a covering member having desired ornamentation property, and the appearance quality can be thereby improved. Accumulation of dust on the flexible film 11d or on the wiring 11a is also prevented and, further, shorting between the wirings 11a that is caused by dust or by moisture due to dew condensation can be prevented as well. Although, in the examples of FIG. 10A and FIG. 10B, the covering member 11e is provided on each side of the flexible film 11d, the covering member 11e can be provided at a surface of the flexible film 11d that faces the vehicular driver M (see FIG. 3) or an opposite surface thereof, for example. Both front and back surfaces of the flexible film 11 can be covered collectively with a hollow covering member.

The covering member 11e is formed of an arbitrary material such as a metal or a resin, for example, and, preferably, is formed of an insulative material. In a case where the covering member 11e is formed of a material having rigidity, individually formed members are linked by way of a hinge or the like, and a bendable portion can be thereby provided in at least one position. The covering member 11e can have an arbitrary structure which is bendable in at least one position to an extent such that bending of the flexible film 11d is not significantly limited. The covering member 11e can be adhered to the flexible film 11d or the coverlay 11d1 using an insulative adhesive or the like, and the covering member 11e can be fixed to the flexible film 11d or the like by way of arbitrary means.

In the examples shown in FIG. 10A and FIG. 10B, the second driver 12 is also covered with the covering member 11e that covers the flexible film 11d. Accumulation of dust or the like on the second driver 12 is prevented, and shorting among a plurality of transistors constituting the second driver 12 can be prevented. However, the covering member 11e does not necessarily need to cover the second driver 12.

As described previously, it is preferable that the first driver 11 be disposed at the edge portion of the shading member 2 along the longitudinal direction of the display screen 3b in a case where the display apparatus 3 has a rectangular display screen 3b. However, the first driver 11 can be disposed at the edge portion of the shading member 2 along the short edge direction of the display screen 3b. For example, in a case where the edge portion of the shading member 2 along the short edge direction of the display screen 3b is less conspicuous than the edge portion of the shading member 2 along the long edge direction of the display screen 3b, the first driver 11 is preferably disposed at the edge portion along the short edge direction of the display screen 3b as shown in FIG. 11.

Figure 11:
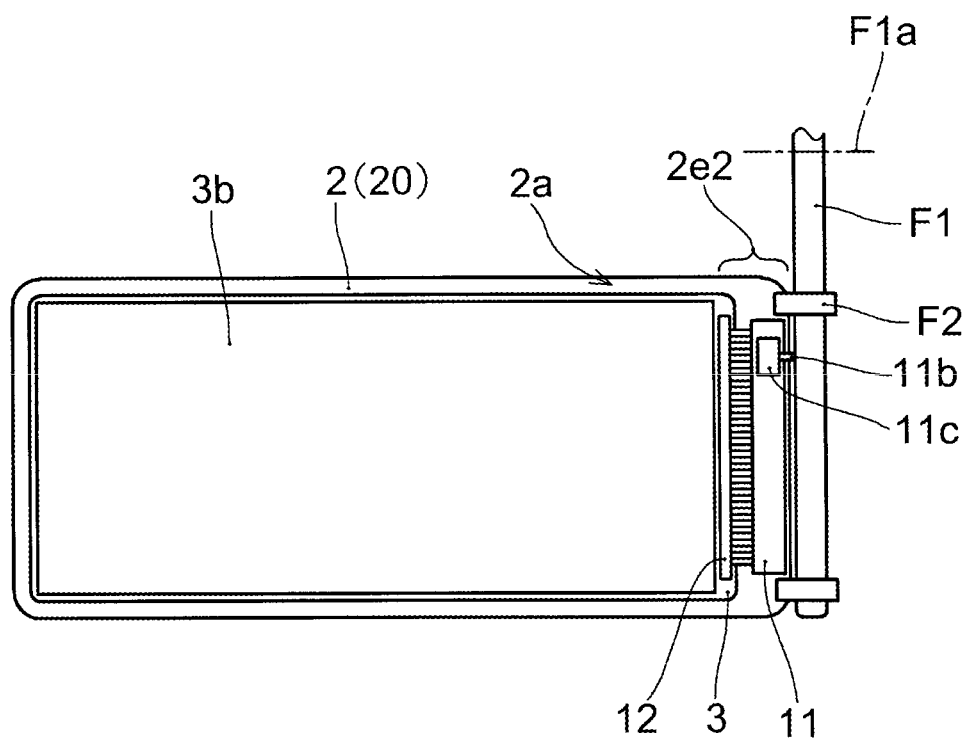
FIG. 11 shows a front view of a further example of the layout of each driver of the shading device according to the first embodiment.

In an example of FIG. 11, the display apparatus 3 is provided with the substantially rectangular display screen 3b, and the first driver 11 is disposed at the second edge portion 2e2 of the edge of the shading member 2 along the short edge direction of the display screen 3b. In this example, the first driver 11 is disposed on the first surface 2a of the shading member 2. Also, the second driver 12 is provided along the short edge direction of the display screen 3b, and is provided at the edge portion of the display apparatus 3 that is adjacent to the second edge 2e2 of the shading member 2, along the short edge direction of the display screen 3b. The shading member 2 is fixed to the supporting member F1 extending from the ceiling portion of the vehicular compartment of the motor vehicle C (see FIG. 1), for example, by the engaging member F2 attached to the second edge portion 2e2. As in the example shown in FIG. 9A or the like described previously, the first driver 11 is connected to the conductive wire 11b by way of thermocompression at the connection portion 11c, and the conductive wire 11b is inserted into the supporting member F1.

In the supporting member F1 shown in FIG. 11, a bending portion F1a can be provided in a desired position by way of a hinge (not shown). In addition, by bending and stretching at the bending portion F1a of the supporting member F1, the shading member 2, as shown in FIG. 8B described previously, can be positioned in the non-use position P0 and any use position (for example, the use position P1). In that case, as shown in FIG. 11, if the first driver 11 is disposed, it is considered that a mechanical stress which can be applied to the connection portion 11c between the first driver 11 and the conductive wire 11b concurrently with movement of the position of the shading member 2 be reduced. It is considered that strength deterioration of the connection portion 11c be suppressed.

It is preferable that the second edge portion 2e2 be present at an edge portion along the vertical direction of the motor vehicle C and at an edge portion which is to be positioned more closely to the door than a central portion in the widthwise direction of the motor vehicle C when the shading member 2 is used relative to the front windshield of the motor vehicle C (see FIG. 1). That is, in a case where the shading member 2 is used relative to the vehicular driver seat provided on the right of the motor vehicle C, the first driver 11, as shown in FIG. 11, is preferably disposed at the right edge facing the first surface 2a of the shading member 2. Alternatively, in a case where the shading member 2 is used relative to the vehicular driver seat provided on the left of the motor vehicle C, the first driver 11 is preferably disposed at the left edge facing the first surface 2a of the shading member 2. Similarly, in a case where the shading member 2 is used relative to the passenger seat of the motor vehicle C as well, the first driver 11 is preferably disposed at an edge which is closer to the door than the central portion of the motor vehicle C. In a case where a blind spot is produced by the first driver 11, it is considered that unnatural visual feeling provided to the vehicular driver or the like be reduced.

In FIG. 12, essential constituent elements of the shading device 1 of the embodiment is shown in a block diagram. The image pickup data generated by the image pickup device 4 is sent to the data processing circuit 5. The display image data generated by the data processing circuit 5 based on the image pickup data is sent to the first driver 11, and each pixel of the display apparatus 3 is driven based on a signal generated by the first driver 11. Consequently, the image based on the display image data is displayed on the display portion 3a of the display apparatus 3. The first detector 6 described previously is connected to the data processing circuit 5. The second detector 8 is connected to the control circuit 7 and the data processing circuit 5.

As shown in FIG. 12, the shading device 1 of the embodiment is further provided with a third detector 13. The third detector 13 is connected to the control circuit 7. The control circuit 7 is connected to the switch 9 and the display apparatus 3. The switch 9, in an example of FIG. 12, is connected between a power line V and the shading member 2 (dimming glass plate 20). FIG. 12 is merely provided as an example of a configuration of the shading device 1 in the embodiment, and the shading device 1 does not necessarily need to include all the constituent elements shown in FIG. 12 or can further include a constituent element not shown in FIG. 12. Also, an internal configuration of the data processing circuit 5 is construed to be not limited to the one shown in FIG. 12. Next, the third detector 13, the control circuit 7, and the data processing circuit 5 will be described in order.

The third detector 13 detects the intensity of light incident on the dimming glass plate 20. As the third detector 13, for example, a photodiode and a phototransistor or an illuminance sensor or the like is shown. However, the third detector 13 is construed to be not limited thereto as long as it is possible to output a result of detection according to the intensity of light. The third detector 13 is preferably disposed around the dimming glass plate 20. The third detector 13 can be disposed in an arbitrary position as long as it is a position that can be illuminated by sunlight illuminating the dimming glass plate 20.

In addition to control of the ON/OFF state of the display apparatus 3 described previously, the control circuit 7, based on a result of detection of the third detector 13, controls the switch 9 to change light transmittance of the dimming glass plate 20. For example, the control circuit 7 compares the result of detection of the third detector 13 and a given threshold, and controls the switch 9 to an open state in a case where the result of detection of the third detector 13 shows that the third detector 13 is being illuminated by the incident light with a strength of the given threshold or more. Application of a voltage from the power line V to the dimming glass plate 20 is stopped.

Consequently, the light transmittance of the dimming glass plate 20 lowers and sunlight is obstructed by the dimming glass plate 20. As described previously, when the switch 9 can switch the magnitude of a voltage input to the dimming glass plate 20 stepwisely or continuously, it is preferable that the control circuit 7 be operative to switch the state of the switch 9 in multiple steps as well. The control circuit 7 can be composed of a combination of a comparator and some gate elements, for example. Also, the control circuit 7 can be composed of a portion of a microcomputer or a gate array or can be included in the data processing circuit 5.

The data processing circuit 5 constitutes circuit blocks, each having its inherent function. The data processing circuit 5 includes a data generation circuit 50, an angle identification circuit 51, a data correction circuit 52, a display target data selection circuit 53, a memory circuit 54, a comparison circuit 55, and a display image highlighting circuit 56. The display target data selection circuit 53 is provided with a memory circuit 53a. These circuit blocks can partially or entirely share a same circuit element. The data processing circuit 5 can be formed of a microcomputer or an ASIC, or an arbitrary semiconductor device for signal processing, such as an FPGA, and its peripheral circuits. The microcomputer or the like operates in accordance with the software that defines given processing procedures. Each circuit block in the data processing circuit 5 can be individually formed using a semiconductor integrated circuit device or a discrete semiconductor device.

The data generation circuit 50 is a circuit block which is responsible for performing basic functions of the data processing circuit 5, and generates, based on imaging data, display image data including information related to light emission intensity and light emission timing for each pixel of the display apparatus 3. The data generation circuit 50 is used to generate a drive signal of an organic EL display panel or the like, for example, and can be a so-called a timing controller and its peripheral circuits that operate in accordance with the software that defines given processing procedures.

Referring to FIGS. 13A, 13B, 14A and 14B, functions of an angle identification circuit 51 and a data correction circuit 52 will be described below. The angle identification circuit 51 identifies an angle θA of the line of vision of the operator (vehicular driver M in the embodiment) facing the shading member 2 relative to the first surface 2a of the shading member 2, based on at least a result of detection of the first detector 6 (see FIG. 7). For example, the angle identification circuit 51 can identify the angle θA of the line of vision I of the vehicular driver M relative to the first surface 2a of the shading member 2, assuming that the shading member 2 is positioned in a preset use position (reference use position). In this case, when the shading member 2 is positioned in the reference use position, it is preferable that means for notifying the fact to the operator be provided. For example, a recess portion such as a notch can be provided on a surface of the supporting member F1 that engages with the engaging member F2. In addition, when the shading member 2 is present in the reference use position, on the surface that engages with the engaging member F2, a minute projecting portion can be provided so as not to prevent movement of the shading member 2 in a position opposite to the recess portion. The reference use position can be an arbitrary position in the movement range of the shading member 2, and, for example, the reference use position is a position in which the first surface 2a of the shading member 2 is positioned so as to be along the vertical direction of the motor vehicle C.

A position relationship between the shading member 2 that is present in the reference use position and the two cameras 6a, 6b (see FIG. 7) that are the constituent elements of the first detector 6, and that are present in the known positions, can be specified in advance. Also, as described previously, the first detector 6 can detect the positions of the eyes of the vehicular driver M relative to the eye detection cameras 6a, 6b. Therefore, the positions of the eyes of the vehicular driver M relative to the first surface 2a of the shading member 2 that is assumed to be present in the reference use position are specified as well. Consequently, it is possible to specify the direction of the line of vision I of the vehicular driver M who sees the shading member 2 that is assumed to be present in the reference use position. That is, based on a result of detection of the first detector 6, it is possible to identify the angle θA of the line of vision I of the vehicular driver M facing the shading member 2 relative to the first surface 2a of the shading member 2 that is assumed to be present in the reference use position.

In addition, the angle identification circuit 51 can identify an angle of the line of vision I of the vehicular driver M based on the result of detection of the first detector 6 and the result of detection of the second detector 8 (see FIGS. 8A and 8B). As described previously, the second detector 8 can detect a position in the rotating direction of the shading member 2. Therefore, the position relationship between the shading member 2 that is actually positioned in a specific use position and the two eye detection cameras 8a, 8b that are present in the known positions can be specified based on the result of detection of the second detector 8 as well. Therefore, the angle θA of the line of vision I of the vehicular driver M facing the shading member 2 relative to the first surface 2a of the shading member 2 that can be used in an arbitrary position can be specified more accurately. The angle identification circuit 51 operates in accordance with the software or the like including procedures for specifying the angle θA in this manner, for example.

Figure 13A:
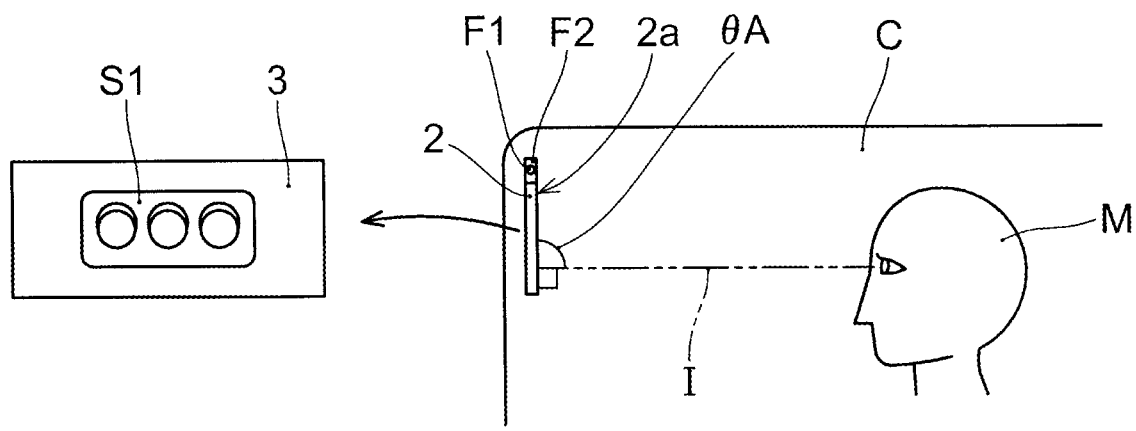
FIG. 13A shows an example of an angle between the shading member of the shading device according to the first embodiment and a line of vision of an operator.
Figure 13B:
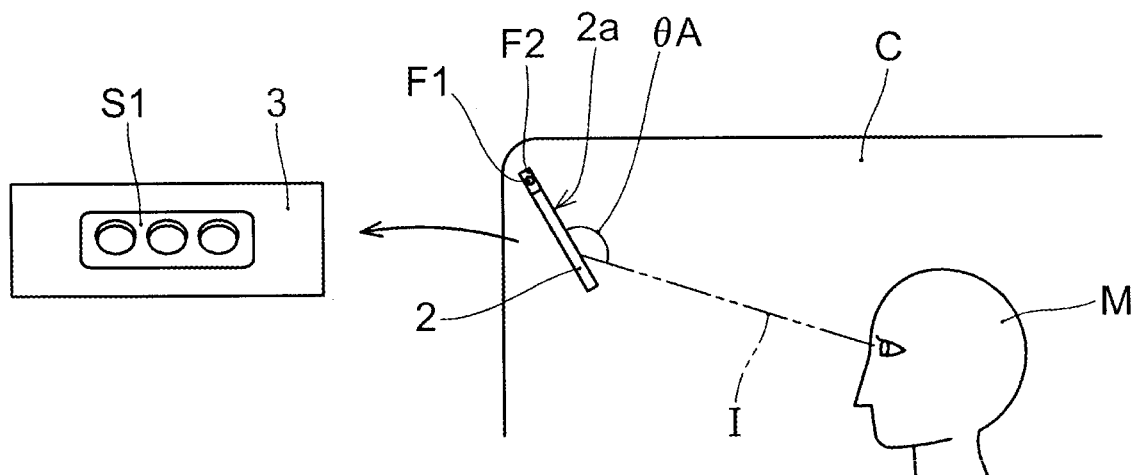
FIG. 13B shows another example of an angle between the shading member of the shading device according to the first embodiment and the line of vision of the operator.

The data correction circuit 52 corrects imaging data based on a difference Δθ in an angle θA relative to a given reference angle (hereinafter, a description will be given assuming that the reference angle is 90 degrees). As shown in FIG. 13A, in a case where the angle θA is 90 degrees (the angle Δθ is zero and the first surface 2a of the shading member 2 and the line of vision I are orthogonal), as illustrated in the left view in FIG. 13A, an image of traffic lights S1 displayed on the display apparatus 3 is grasped by the line of vision of the vehicular driver in a generally proper manner. However, as shown in FIG. 13B, in a case where the angle θA is an angle other than 90 degrees, as shown in the left view in FIG. 13B, the image of the traffic lights S1 is grasped by the eyes of the vehicular driver M in a shape in which the image is reduced and distorted in the vertical direction. The data correction circuit 52 corrects imaging data so that the image displayed on the display apparatus 3 can be properly grasped by the eyes of the vehicular driver M even in the state as shown in FIG. 13B, based on the difference Δθ between the given reference angle and the angle θA.

For example, the data correction circuit 52 replaces, with data of pixel one up from a center pixel, data of pixel two up from the center pixel in the vertical direction of a region displayed on the display apparatus 3 of imaging data. Data of pixel three up from the center pixel and data of pixel four up therefrom are also replaced with data of pixel two up from the center pixel (data before being replaced as described previously). The data correction circuit 52 performs such data correction on the imaging data corresponding to the region displayed on the display apparatus 3. By performing such correction, the image displayed on the display apparatus 3 can be enlarged to twice in the vertical direction. The magnification of enlarging a display image in the vertical direction is selected based on the difference Δθ in the angle θA relative to the given reference angle. For example, the display image is enlarged in the vertical direction at a greater magnification, as the angle θA of the line of vision of the vehicular driver M relative to the first surface 2a of the shading member 2 departs from 90 degrees.

Figure 14A:
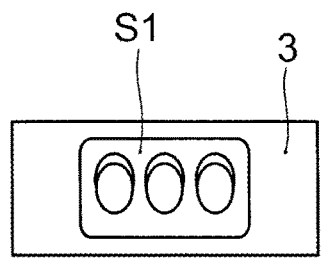
FIG. 14A shows a display image corrected by a data correction circuit of the shading device according to the first embodiment.
Figure 14B:
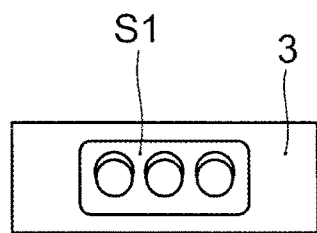
FIG. 14B shows the display image of FIG. 14A in a shape seen in the eyes of the operator.

The data processing circuit 5 generates display image data based on the image pickup data corrected by the data correction circuit 52 so as to display, on the display apparatus 3, the display image that is corrected for a difference between the given reference angle and the angle of the line of vision I relative to the first surface 2a of the shading member 2. By doing so, for example, on the actual display apparatus 3, the image enlarged in the vertical direction is displayed as shown in FIG. 14A. As shown in FIG. 14B, however, this enlarged image is grasped by the vehicular driver, as an image of which shape is close to a shape of an original display target (traffic lights S1 in FIG. 14B). It is considered to be easy for the vehicular driver to identify a display target. The data correction circuit 52 can perform correction on the display image data generated by the data generation circuit 50.

Figure 15:
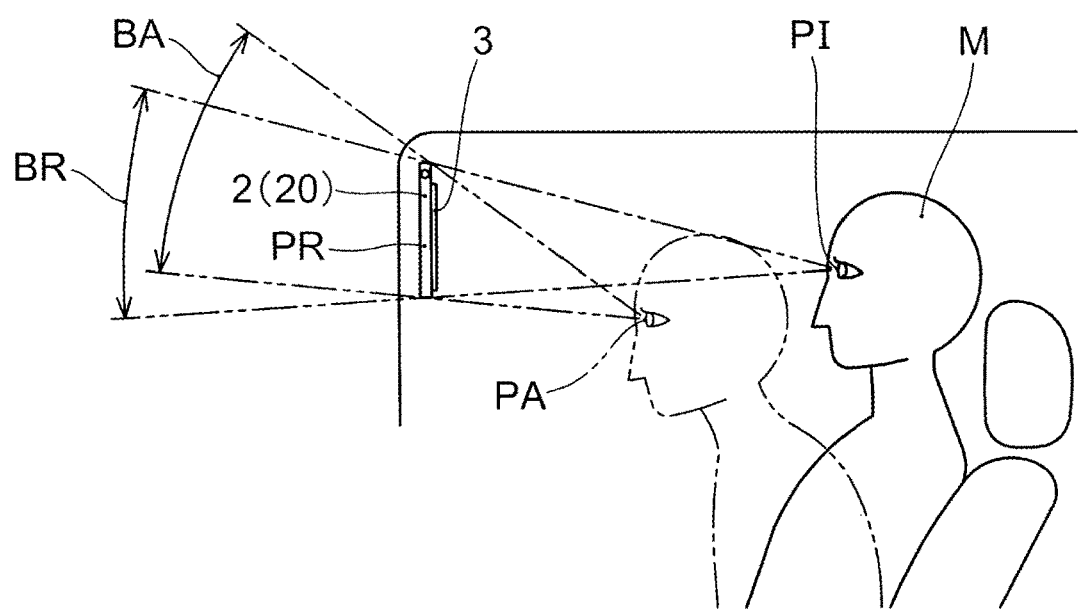
FIG. 15 shows an example of a blind spot portion when the shading device according to the first embodiment obstructs sunlight.
Figure 16:
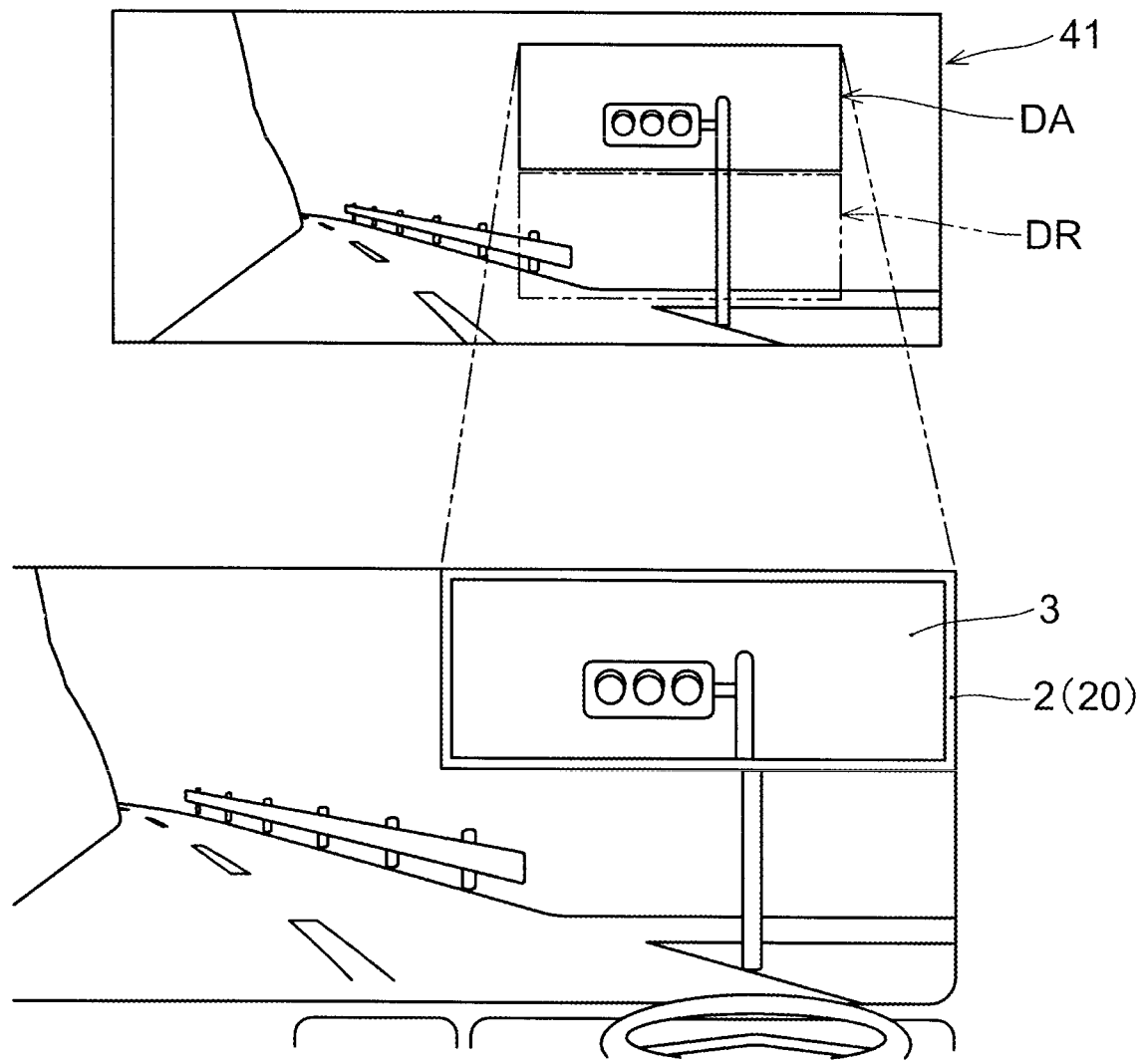
FIG. 16 shows an example of a display image that corresponds to the blind spot portion when the shading device according to the first embodiment obstructs sunlight.

Next, referring to FIG. 15 and FIG. 16, functions of the display target data selection circuit 53 (see FIG. 12) will be described.

It is considered to be preferable to display, on the display apparatus 3, only the view of a blind spot portion produced when the light transmittance of the dimming glass plate 20 is low in the field of vision of the operator (vehicular driver M in the embodiment) of the shading member 2 in terms of the fact that an image is grasped by the eyes of the vehicular driver M without unnatural feeling. As shown in FIG. 15, if the reference position PR of the shading member 2 and the reference position PI of the eyes of the vehicular driver M are determined, a blind spot portion (reference blind spot portion BR) in the image pickup region of the image pickup device 4 (see FIG. 4) is determined based on these positions and the size of the shading member 2. The image pickup region is fixedly defined by the position or characteristics of the image pickup device 4. If the positions of the shading member 2 and the eyes of the vehicular driver M are fixed, only the view of the blind spot portion is displayed all the time on the display apparatus 3 by defining, as a display target region, a region (reference display target region) corresponding to the reference blind spot portion BR. However, the positions of the shading member 2 and the eyes of the vehicular driver M move, and the blind spot portion thereby varies. Thus, it is preferable to change the display target region according to variation of the blind spot portion. The display target data selection circuit 53, for the sake of such display, determines a blind spot portion obstructed by the shading member 2 of which transmission of light is lowered, in the field of vision of the operator of the shading member 2, and selects the display target data corresponding to the blind spot portion of the image pickup data.

The first detector 6 and the second detector 8 are connected to the display target data selection circuit 53 (see FIG. 12). Therefore, information about the position of the shading member 2 and the positions of the eyes of the vehicular driver M is input to the display target data selection circuit 53. The display target data selection circuit 53 is also provided with the memory circuit 53a (see FIG. 12). In the memory circuit 53a, information related to a difference between a blind spot portion BA produced by being obstructed by the dimming glass plate 20 of which light transmittance is lowered, for each of a variety of positions and/or angles of the shading member 2 and the positions of the eyes of the vehicular driver M, and the reference blind spot portion BR, is stored. In FIG. 15, as an example, the blind spot portion BA when the eyes of the vehicular driver M are present in the position PA is shown. For example, in the memory circuit 53a, the movement quantity in the vertical direction and the transverse direction relative to the reference blind spot portion BR and an enlargement rate or a reduction rate or the like, which are required to obtain a position of the actual blind spot portion BA, are stored. The display target data selection circuit 53 specifies the position of the actual blind spot portion BA by way of numeric calculation or the like, based on the information about the position of the shading member 2 and the positions of the eyes of the vehicular driver M and the storage contents of the memory circuit 53a from the first and second detectors 6, 8. The display target data selection circuit 53 then selects the data of the region corresponding to the actual blind spot portion BA of the image data as the display target data to be a display target.

The display target data selection circuit 53 can select display target data based on a result of detection by the first detector 8, assuming that the shading member 2 is positioned in the "reference use position", as described previously, without using a result of detection of the second detector 8.

Next, the data generation circuit 50 generates display image data based on the selected display target data so as to cause the display apparatus 3 to display the actual view of the blind spot portion BA. Consequently, as shown in FIG. 16, an image of the display target region DA to be actually displayed, which has been changed for the reference display target region DR corresponding to the reference blind spot portion (which has been shifted upward in an example of FIG. 16), of the image pickup region 41, is displayed on the display apparatus 3. An image with less unnatural feeling in comparison with the view over the front windshield can be displayed on the display apparatus 3.

The display target data selection circuit 53 can have a function of cancelling a fine swing of image display that is caused by a relative slight motion of the vehicular driver M relative to a vehicle body. For example, the display target data selection circuit 53 can be configured to increase the period of sampling information from the first detector 6, in a case where the information from the first detector 6 (see FIG. 7) varies frequently at a predetermined level or more.

The display target data selection circuit 53 can also be configured so as not to newly start a selection operation of display target data, in a case where a position change of the eyes of the vehicular driver M fails to meet a given condition. In addition, a low pass filter can be provided at an input portion that receives information from the first detector 6 in the display target data selection circuit 53.

Figure 17:
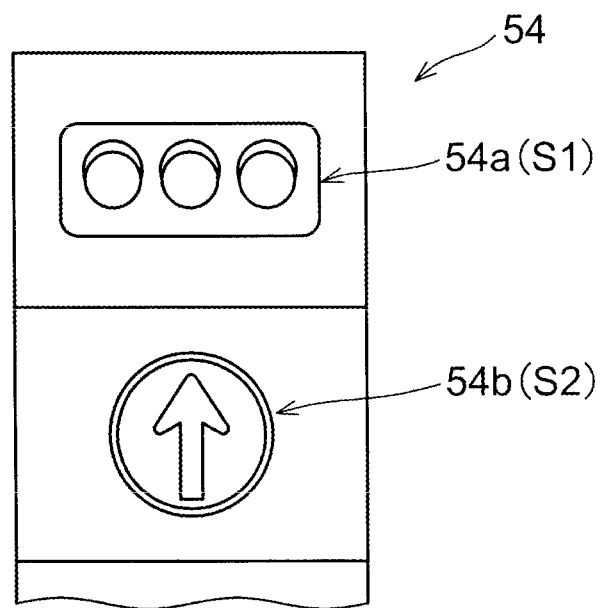
FIG. 17 conceptually shows an example of data stored in a memory circuit of the shading device according to the first embodiment.

Next, referring to FIGS. 17, 18A, and 18B, functions of the display image highlighting circuit 56, the comparison circuit 55, and the memory circuit 54 (see FIG. 12) will be described.

The memory circuit 54 stores reference data related to appearance features of a predetermined target that can be picked up, as an image, by the image pickup device 4 (see FIG. 4). In FIG. 17, an example of reference data 54a, 54b that are stored in the memory circuit 54 is conceptually shown as an image that can be reconstructed by the reference data 54a, 54b. That is, as shown in FIG. 17, in the memory circuit 54, the appearance features of targets such as traffic lights 51 and a road sign S2 that are likely to be shot, as an image, by the image pickup device 4 are stored as data. For example, in the memory circuit 54, imaging data generated by actually shooting the traffic lights as an image by the image pickup device 4 is stored. Alternatively, the shape of the traffic lights 51 or the like is modeled using unit elements such as microtriangles and the reference data 54a, 54b can be formed of the vertex coordinate of the respective unit elements. The reference data can be formed in an arbitrary method. The memory circuit 54, although construed to be not limitative in particular, is composed of an arbitrary semiconductor storage device such as an SRAM or a PROM, for example. A same storage device can be shared between this memory circuit and the memory circuit 53a of the display target data selection circuit 53 described previously.

The comparison circuit 55 compares the imaging data generated by the image pickup device 4 and the reference data 54a, 54b that are stored in the memory circuit 54. The comparison circuit 55 can reconstruct the imaging data and the reference data 54a, 54b, as an image, and then compare these items of data by a pattern recognition technique. Also, if the data formats of the imaging data and the reference data 54a, 54b are the same as each other, both of the data can be sequentially compared with each other as actual data in bits or bytes. A method of comparison to be performed by the comparison circuit is construed to be not limitative in particular. The comparison circuit 55 detects approximate imaging data in a case where there is the approximate imaging data approximating either of the reference data 54a, 54b such that predetermined criteria are met by comparison between the imaging data and the reference data 54a, 54b.

The display image highlighting circuit 56, in a case where approximate imaging data has been detected as a result of comparison of the comparison circuit 55, causes the display apparatus 3 to display a display image of a target that is displayed based on the approximate imaging data so as to be highlighted more significantly than any other display images. Specifically, the display image highlighting circuit 56 processes the display image data that is generated based on the approximate imaging data, of the display image data generated by the data generation circuit 50 (see FIG. 12).

Figure 18A:
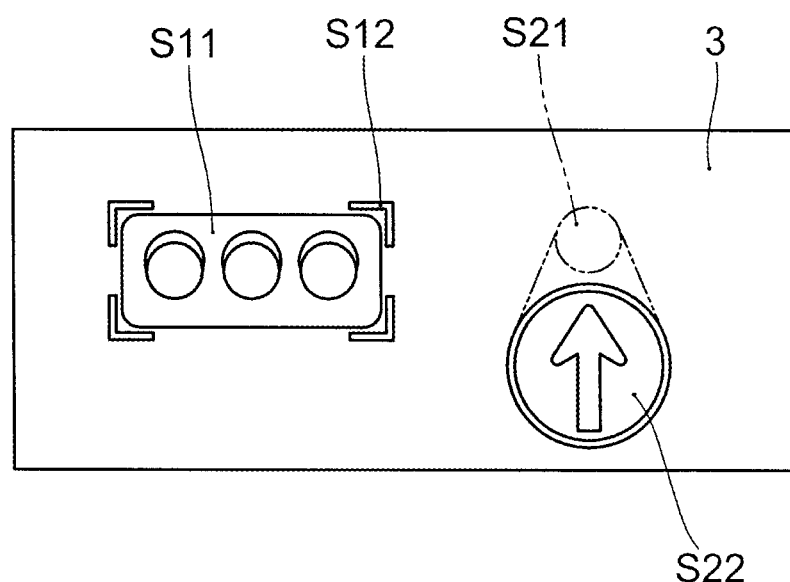
FIG. 18A shows an example of an image displayed to be highlighted by the shading device according to the first embodiment.
Figure 18B:
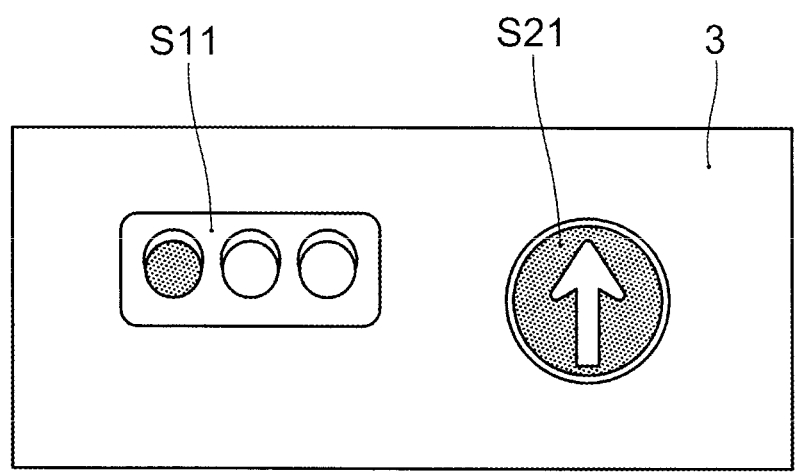
FIG. 18B shows another example of the image displayed to be highlighted by the shading device according to the first embodiment.

For example, the display image highlighting circuit 56 processes data of pixels around an image S11 of a highlighting target (traffic lights), as shown on the left in the display apparatus 3 of FIG. 18A, and displays a frame S12 surrounding the image S11 so that the image S11 is highlighted. Also, as shown on the right in the display apparatus 3 of FIG. 18A, the data of pixels around the image S21 of a highlighted target (traffic sign) is processed, and an enlarged image S22 of the image 21 can be displayed. In addition, the display image highlighting circuit 56, as shown in FIG. 18B, can increase the luminance of subpixels of a specific color so as to highlight the specific color (for example, red or blue) in the display images S11, S21 of the highlighted target.

Further, the display image highlighting circuit 56, in a case where approximate imaging data is, causes the display apparatus 3 to display, as a still image in a given time frame, an image to be displayed based on the imaging data in which the approximate imaging data is included. For example, the display image data generated by the data generation circuit 50 is recorded any time in a video memory (not shown). When approximate imaging data has been then detected, the display image data to be sent to the display apparatus 3 can be switched from the display image data generated any time by the data generation circuit 50 to the display image data recorded in the video memory (not shown). It is construed that the display image highlighting circuit 56 can highlight a specific image by an arbitrary method without being limitative thereto. By such highlighting, it is possible to increase the visibility relative to a target with a great need to cause the vehicular driver M to recognize.

In the foregoing embodiment, the shading device 1 of the embodiment has been described by way of example of a case in which the shading device is used for the front windshield of the motor vehicle. However, the shading device 1 of the embodiment is not construed to be limitative to the front windshield, and is adaptable to a rear windshield of a motor vehicle, a windshield of an arbitrary vehicle, or window glasses of another arbitrary vehicle and an arbitrary building, as described previously.

SUMMARY

A shading device according to a first aspect of the present invention is characterized by comprising: shading member formed using a dimming glass plate capable of changing light transmittance, the shading member having a plate shape; a display apparatus being capable of transmitting light and disposed on a surface of the shading member, the surface being to face an operator during use of the shading member, in such a manner that a display portion faces the operator; an image pickup device to pick up, as an image, a region which an opposite surface of the surface faces, and generate image pickup data; a data processing circuit to generate display image data to be displayed on the display portion during use of the shading member, based on the image pickup data generated by the image pickup device; and a switch to change light transmittance in the dimming glass plate.

According to the configuration of the first aspect of the present invention, it is possible to provide a shading device in which an image of a view including a region obstructed by a shading member during use of the shading device can be displayed to face an operator of the shading member and, moreover, even if the shading device is positioned in a use position when not in use, it is more difficult to produce a blind spot.

A shading device according to a second aspect of the present invention, in the first aspect, further comprises a first detector that detects a position of an eye of an operator of the shading member, and the data processing circuit further includes: an angle identification circuit to identify an angle of a line of vision of the operator facing the shading member relative to the surface, based on a result of detection of the first detector; and a data correction circuit to correct the image pickup data based on a difference of an angle of the line of vision relative to a given reference angle, and the data processing circuit can generate the display image data based on image pickup data corrected by the data correction circuit to display, on the display apparatus, a display image corrected for the difference of the angle of the line of vision relative to the given reference angle.

According to the second aspect of the present invention, an image easily recognizable for an operator can be displayed on a display apparatus according to a position of an eye of the operator.

In a shading device according to a third aspect of the present invention, in the second aspect, the data processing circuit further comprises a display target data selection circuit to determine a blind spot portion obstructed by the shading member in a field of vision of an operator of the shading member, and select display target data among the image data, the display target data corresponding to the blind spot portion, and the data processing circuit can generate the display image data based on the display target data to cause the display apparatus to display a view of the blind spot portion.

According to the configuration of the third aspect of the present invention, even in a case where a blind spot portion produced by a shading member with movement of an operator varies, it is possible to cause a display apparatus to display an image with less unnatural feeling for the operator.

A shading device according to a fourth aspect of the present invention, in the second or third aspect, further comprises a second detector to detect a position of the shading member, and the angle identification circuit can identify an angle of the line of vision based on a result of detection of the first detector and a result of detection of the second detector.

According to the configuration of the fourth aspect of the present invention, an image corrected or selected based on a use position of the shading member can be displayed on a display apparatus.

A shading device according to a fifth aspect of the present invention, in any one of the first to fourth aspects, can further comprise a control circuit to control an ON/OFF state of the display apparatus based on light transmittance of the dimming glass plate.

According to the configuration of the fifth aspect of the present invention, an operator can reduce operations performed by the operator of a shading member required to display, on a display apparatus, a view of a portion obstructed by a dimming glass plate.

A shading device according to a sixth aspect of the present invention, in the fourth aspect, can further comprise a control circuit to control the display apparatus to an OFF state when the light transmittance of the dimming glass plate is greater than or equal to a predetermined reference value, and control an ON/OFF state of the display apparatus based on a result of detection of the second detector when the light transmittance of the dimming glass plate is less than the given reference value.

According to the configuration of the sixth aspect of the present invention, an operator of a shading member can cause a display apparatus to display an image or stop the display merely by operating the shading member and/or changing the light transmittance of the dimming glass plate.

A shading device according to a seventh aspect of the present invention, in the fifth or sixth aspect, further comprises a third detector to detect intensity of light incident on the dimming glass plate, and the control circuit can further control the switch to change the light transmittance of the dimming glass plate, based on a result of detection of the third detector.

According to the configuration of the seventh aspect of the present invention, light shielding property of a shading member can be changed according to intensity of light incident into room or the like.

In a shading device according to an eighth aspect of the present invention, in any one of the first to seventh aspects, the data processing circuit can have: a memory circuit to stores reference data related to an appearance feature of a given target; a comparison circuit to compare the image pickup data and the reference data; and a display image highlighting circuit to process the display image data to highlight a display image of the given target that is displayed on the display apparatus more significantly than other display images.

According to the configuration of the eighth aspect of the present invention, it is possible to increase visibility relative to a target with a great need to cause an operator to recognize, and it is also possible to reduce oversight by the operator relative to such a target.

A shading device according to a ninth aspect of the present invention, in any one of the first to eighth aspects, can further comprise a first driver that is provided separately from the display apparatus, to output a signal used to drive a pixel of the display apparatus, based on the display image data.

According to the configuration of the ninth aspect of the present invention, a pixel of a display apparatus can be appropriately driven based on display image data.

In a shading device according to a tenth aspect of the present invention, in the ninth aspect, the display apparatus comprises a substantially rectangular display screen, and the first driver can be disposed at a first edge portion of edge portions of the shading member, the first edge portion being along a longitudinal direction of the display screen at an edge of the shading member and to be oriented to an upper side during use of the shading member.

According to the configuration of the tenth aspect of the present invention, a blind spot that can be produced by a first driver can be limited to an upper edge portion of a windshield and a wiring length between the first driver and a pixel of a display apparatus can be reduced.

A shading device according to an eleventh aspect of the present invention, in the ninth aspect, further comprises a flexible film comprising a wiring that connects the first driver and the display apparatus, the first driver is provided to be spaced from the shading member, the display apparatus comprises a substantially rectangular display screen, and the flexible film can be connected to a portion of edge portions of the display apparatus, the portion being along a longitudinal direction of the display screen.

According to the configuration of the eleventh aspect of the present invention, it is possible to ensure that a blind spot is prevented from being produced by a first driver, and, even if a shading member rotates, connection between the first driver and a display apparatus can be normally maintained and a wiring length between the first driver and a pixel of the display apparatus can be reduced.

In a shading device according to a twelfth aspect of the present invention, in the eleventh aspect, the flexible film can be connected to the display apparatus at a first edge portion of the shading member, the first edge portion being along the longitudinal direction of the display screen and to be oriented to an upper side during use of the shading member.

According to the configuration of the twelfth aspect of the present invention, a flexible film can be disposed at an upper edge portion of a window.

In a shading device according to a thirteenth aspect of the present invention, in the eleventh or twelfth aspect, the flexible film can be covered with a covering member that is bendable at least in one position.

According to the configuration of the thirteenth aspect of the present invention, ornamentation property of a peripheral portion of a shading member can be improved. Accumulation of dust or the like on a flexible film or wiring and/or shortcircuit failure caused by dew condensation can be prevented as well.

In a shading device according to a fourteenth aspect of the present invention, in the thirteenth aspect, the display apparatus further comprises a second driver to drive the pixel based on an output signal of the first driver, and the second driver can be covered with the covering member.

According to the configuration of the fourteenth aspect of the present invention, shortcircuit failure between wiring and a transistor constituting a second driver can be prevented.

In a shading device according to a fifteenth aspect of the present invention, in the ninth aspect, the display apparatus comprises a substantially rectangular display screen, and the first driver can be disposed at a second edge portion of edge portions of the shading member, the second edge portion being along a short edge direction of the display screen.

According to the configuration of the fifteenth aspect of the present invention, a mechanical stress that can be applied to a connection portion with wiring in a first driver concurrently with movement of a shading member can be reduced.

In a shading device according to a sixteenth aspect of the present invention, in the fifteenth aspect, in a case where the shading member is used for a windshield of a motor vehicle, the second edge portion can be an edge portion to be positioned along a vertical direction of the motor vehicle and closer to a door than a central portion in a widthwise direction of the motor vehicle.

According to the configuration of the sixteenth aspect of the present invention, even in a case a blind spot is produced by a first driver 11, unnatural visual feeling provided to a vehicular driver of a motor vehicle or the like can be reduced.

In a shading device according to a seventeenth aspect of the present invention, in any one of the first to sixteenth aspects, the display apparatus can be an organic EL display panel.

According to the configuration of the seventeenth aspect of the present invention, a display apparatus capable of transmitting light can be easily configured.

In a shading device according to an eighteenth aspect of the present invention, in any one of the first to seventeenth aspects, the image pickup device can comprise a lens having a surface on which a coating layer to reduce reflection of light by adjusting a refractive index is formed.

According to the configuration of the eighteenth aspect of the present invention, even in a case where imaging by an image pickup device is performed against sunlight, an image with less flare or ghost can be displayed on a display apparatus.

In a shading device according to a nineteenth aspect of the present invention, in any one of the first to eighteenth aspects, the dimming glass plate can include two conductive films allowing light to pass therethrough and liquid crystal molecules sealed in between the two conductive films.

According to the configuration of the nineteenth aspect of the present invention, a voltage applied to a dimming glass plate is controlled to be thereby able to easily change light transmittance of the dimming glass plate.

DESCRIPTION OF REFERENCE NUMERALS

1 Shading device
2 Shading member
2a Surface (first surface)
2b Opposite surface (second surface)
2e1 First edge portion
2e2 Second edge portion
20 Dimming glass plate
21a, 21b Glass plate
22 Liquid crystal sheet
22a Liquid crystal molecules
22b, 22c Conductive film
3 Display apparatus
3a Display portion
30 Organic EL display panel
4 Image pickup device
4a Coating layer
41 Image pickup region
5 Data processing circuit
50 Data generation circuit
51 Angle identification circuit
52 Data correction circuit
53 Display target data selection circuit
53a Memory circuit
54 Memory circuit
54a, 54b Reference data
6 First detector
6a, 6b Eye detection camera
7 Control circuit
8 Second detector
9 Switch
11 First driver
11a Wiring
11d Flexible film
11e Covering member
12 Second driver
13 Third detector
B Blind spot portion
BA Actual blind spot portion
BR Reference blind spot portion
C Motor vehicle
DR Reference display target region
DA Actual display target region
F1 Supporting member
F2 Engaging member
M Vehicular driver (operator)
P0 Non-use position
P1 Use position

What is claimed is:

1. A shading device comprising:
a shading member formed using a dimming glass plate that is capable of changing light transmittance, the shading member having a plate shape;
an organic EL display panel being separate from the dimming glass plate and capable of transmitting light, wherein the organic EL display panel is disposed on a surface of the shading member, the surface being to face an operator during use of the shading member;
an image pickup device to pick up, as an image, a region which an opposite surface of the surface faces, and generate image pickup data; and a switch to change light transmittance of the dimming glass plate, wherein the organic EL display panel displays, thereon, an image based on the image pickup data;

the organic EL display panel comprises a plurality of subpixels, each one of the plurality of subpixels comprising a cathode and an anode;

the cathode and the anode are disposed with a gap between the cathode and the anode, the gap having a length different from a wavelength of light emitted from each one of the plurality of subpixels so that a micro-cavity effect is not utilized in each one of the plurality of subpixels;

the shading device further comprises:
- a detector to detect a position of the shading member,
- a control circuit to control the organic EL display panel to an OFF state when the light transmittance of the dimming glass plate is greater than or equal to a given reference value, and control an ON/OFF state of the organic EL display panel based on a result of detection of the detector when the light transmittance of the dimming glass plate is less than the given reference value, and
- a sensor capable of detecting intensity of light, the sensor being provided on each of the surface and the opposite surface of the shading member; and wherein the control circuit controls the organic EL display panel to the OFF state in a case where a difference in output between the sensor being provided on the surface of the shading member and the sensor being provided on the opposite surface of the shading member is smaller than a given reference value.

2. The shading device according to claim 1, further comprising a first driver provided separately from the organic EL display panel to output a signal used to drive each one of the plurality of subpixels, wherein the organic EL display panel comprises a substantially rectangular display screen, and the first driver is disposed at a first edge portion of edge portions of the shading member, the first edge portion being along a longitudinal direction of the display screen and to be oriented to an upper side during use of the shading member.

3. The shading device according to claim 1, further comprising a first driver provided separately from the organic EL display panel to output a signal used to drive each one of the plurality of subpixels, wherein the organic EL display panel comprises a substantially rectangular display screen, and the first driver is disposed at a second edge portion of edge portions of the shading member, the second edge portion being along a short edge direction of the display screen.

4. The shading device according to claim 1, wherein the shading device is configured to display, with the organic EL display panel, a view being obstructed by the dimming glass plate when the dimming glass plate obstructs a light illuminating the shading member.

5. The shading device according to claim 1, wherein the OFF state is a state in which the organic EL display panel is configured to display no image.

6. The shading device according to claim 1, wherein the organic EL display panel comprises a display portion on which the image is displayed; and the display portion entirely overlaps with the dimming glass plate.

7. The shading device according to claim 1, wherein the plurality of subpixels comprises at least three subpixels that are for respective colors different from one another; and in each of all subpixels in the plurality of subpixels, the cathode and the anode are disposed with the gap in which the micro-cavity effect is not utilized.

8. The shading device according to claim 1, wherein the plurality of subpixels comprises at least three subpixels that are for respective colors different from one another; and the cathode and the anode are spaced from each other by substantially equal distance among the at least three subpixels.

* * * * *